(12) United States Patent
Rabinovitz

(10) Patent No.: US 11,864,529 B2
(45) Date of Patent: Jan. 9, 2024

(54) LIVESTOCK DRY OFF METHOD AND DEVICE

(71) Applicant: S.C.R. (ENGINEERS) LIMITED, Netanya (IL)

(72) Inventor: Rotem Rabinovitz, Kibbutz Beit Hashita (IL)

(73) Assignee: S.C.R. (ENGINEERS) LIMITED, Netanya (IL)

(*) Notice: Subject to any disclaimer, the term of this patent is extended or adjusted under 35 U.S.C. 154(b) by 253 days.

(21) Appl. No.: 17/283,561

(22) PCT Filed: Oct. 10, 2019

(86) PCT No.: PCT/IL2019/051111
§ 371 (c)(1),
(2) Date: Apr. 8, 2021

(87) PCT Pub. No.: WO2020/075174
PCT Pub. Date: Apr. 16, 2020

(65) Prior Publication Data
US 2021/0386032 A1    Dec. 16, 2021

Related U.S. Application Data

(60) Provisional application No. 62/743,567, filed on Oct. 10, 2018.

(51) Int. Cl.
*A01J 7/00* (2006.01)
*A01J 7/04* (2006.01)
(Continued)

(52) U.S. Cl.
CPC . *A01J 7/04* (2013.01); *A01J 5/01* (2013.01); *A01K 13/001* (2013.01)

(58) Field of Classification Search
CPC .............. A01K 13/001; A01J 7/04; A01J 5/01
See application file for complete search history.

(56) References Cited

U.S. PATENT DOCUMENTS

| 85,575 A | 1/1869 | Drake |
|---|---|---|
| 818,783 A | 4/1906 | Philippi |

(Continued)

FOREIGN PATENT DOCUMENTS

| AU | 199534570 | 10/1994 |
|---|---|---|
| AU | 2003239832 | 5/2002 |

(Continued)

OTHER PUBLICATIONS

Christian Pahl, Eberhard Hartung, Anne Grothmann, Katrin Mahlkow-Nerge, Angelika Haeussermann, Rumination activity of dairy cows in the 24 hours before and after calving, Journal of Dairy Science, vol. 97, Issue 11, 2014, pp. 6935-6941.

(Continued)

*Primary Examiner* — Ebony E Evans

(57) ABSTRACT

A system and method for automatically drying-off a machine-milked dairy animal by controlling milk production during a gradual drying-off period. During the gradual drying-off period, the dairy animal is not milked out. For each milking during this period, an amount of milk to be removed is determined, which is less than the amount removed at a previous milking. When the amount of milk for the current milking has been removed from the dairy animal, milking is stopped. The start of the gradual drying-off period is calculated from the dry-off date, the desired date of cessation of milking for this lactation, and from a predetermined drying-off period.

14 Claims, 6 Drawing Sheets

(51) Int. Cl.
*A01J 5/01* (2006.01)
*A01K 13/00* (2006.01)

(56) References Cited

U.S. PATENT DOCUMENTS

| | | |
|---|---|---|
| 823,079 A | 6/1906 | Rais |
| 1,016,752 A | 2/1912 | Leith |
| 1,188,510 A | 6/1916 | Timson |
| 1,364,137 A | 1/1921 | Pannier |
| 1,759,400 A | 5/1930 | Hobbs |
| 1,843,314 A | 2/1932 | Berntson et al. |
| 1,863,037 A | 6/1932 | Archbold |
| 2,078,827 A | 4/1937 | Ashton |
| 2,553,400 A | 5/1951 | Blair |
| 2,570,048 A | 10/1951 | Cooke et al. |
| 3,091,770 A | 6/1963 | McMurray et al. |
| 3,261,243 A | 7/1966 | Ellison |
| 3,596,541 A | 8/1971 | Bieganski |
| 3,812,859 A | 5/1974 | Murphy et al. |
| 3,884,100 A | 5/1975 | Fideldy |
| 3,981,209 A | 9/1976 | Caroff |
| 4,064,838 A | 12/1977 | Mukarovsky et al. |
| 4,120,303 A | 10/1978 | Villa-Massone et al. |
| 4,121,591 A | 10/1978 | Hayes |
| 4,281,657 A | 8/1981 | Ritchey |
| 4,323,183 A | 4/1982 | Duchin |
| 4,497,321 A | 2/1985 | Fearing et al. |
| 4,516,577 A | 5/1985 | Scott et al. |
| 4,531,520 A | 7/1985 | Reggers et al. |
| 4,552,147 A | 11/1985 | Gardner |
| 4,666,436 A | 5/1987 | McDonald et al. |
| 4,672,966 A | 6/1987 | Haas, Jr. |
| 4,696,119 A | 9/1987 | Howe et al. |
| 4,821,683 A | 4/1989 | Veldman |
| 4,943,294 A | 7/1990 | Knapp |
| 5,154,721 A | 10/1992 | Perez |
| 5,267,464 A | 12/1993 | Cleland |
| 5,651,791 A | 7/1997 | Zavlodaver et al. |
| 5,743,209 A | 4/1998 | Bazin et al. |
| 5,769,023 A | 6/1998 | Van Der Lely et al. |
| 5,778,820 A | 7/1998 | van der Lely et al. |
| 6,007,548 A | 12/1999 | Ritchey |
| 6,016,769 A | 1/2000 | Forster |
| 6,043,748 A | 3/2000 | Touchton et al. |
| 6,053,926 A | 4/2000 | Luehrs |
| 6,095,915 A | 8/2000 | Battista et al. |
| 6,099,482 A | 8/2000 | Brune et al. |
| 6,100,804 A | 8/2000 | Brady et al. |
| 6,113,539 A | 9/2000 | Ridenour |
| 6,114,957 A | 9/2000 | Westrick et al. |
| 6,145,225 A | 11/2000 | Ritchey |
| 6,166,643 A | 12/2000 | Janning et al. |
| 6,172,640 B1 | 1/2001 | Durst et al. |
| 6,209,485 B1 | 4/2001 | Van Der Lely et al. |
| 6,232,880 B1 | 5/2001 | Anderson et al. |
| 6,235,036 B1 | 5/2001 | Gardner et al. |
| 6,271,757 B1 | 8/2001 | Touchton et al. |
| 6,297,739 B1 | 10/2001 | Small |
| 6,310,553 B1 | 10/2001 | Dance |
| 6,402,692 B1 | 6/2002 | Morford |
| 6,497,197 B1 | 12/2002 | Huisma |
| 6,502,060 B1 | 12/2002 | Christian |
| 6,510,630 B1 | 1/2003 | Gardner |
| 6,535,131 B1 | 3/2003 | Bar-Shalom et al. |
| 6,569,092 B1 | 5/2003 | Booker |
| 6,659,039 B1 | 12/2003 | Larsen |
| 6,830,008 B2 | 12/2004 | Sjolund et al. |
| 6,868,804 B1 | 3/2005 | Huisma et al. |
| 7,016,730 B2 | 3/2006 | Ternes |
| 7,046,152 B1 | 5/2006 | Peinetti et al. |
| 7,137,359 B1 | 11/2006 | Braden |
| 7,296,539 B2 | 11/2007 | Iljas |
| 7,380,518 B2 | 6/2008 | Kates |
| 7,705,736 B1 | 4/2010 | Kedziora |
| 7,843,350 B2 | 11/2010 | Geissler et al. |
| 7,937,861 B1 | 5/2011 | Zacher |
| 8,005,624 B1 | 8/2011 | Starr |
| 8,266,990 B1 | 9/2012 | Janson |
| 8,305,220 B2 | 11/2012 | Gibson |
| 8,478,389 B1 | 7/2013 | Brockway et al. |
| 8,622,929 B2 | 1/2014 | Wilson et al. |
| 8,763,557 B2 | 7/2014 | Lipscomb et al. |
| 8,955,462 B1 | 2/2015 | Golden et al. |
| 8,978,584 B2 | 3/2015 | Uslar Valenzuela |
| 9,215,862 B2 | 12/2015 | Bladen et al. |
| 9,392,767 B2 | 7/2016 | Johnson, III et al. |
| 9,392,946 B1 | 7/2016 | Sarantos et al. |
| 9,449,487 B1 | 9/2016 | Spitalny |
| 9,648,849 B1 | 5/2017 | Vivathana |
| 9,654,925 B1 | 5/2017 | Solinsky et al. |
| 9,693,536 B1 | 7/2017 | Dana |
| 9,717,216 B1 | 8/2017 | Schlachta et al. |
| 9,743,643 B1 | 8/2017 | Kaplan et al. |
| 9,848,577 B1 | 12/2017 | Brandao et al. |
| 9,861,080 B1 | 1/2018 | Hathway et al. |
| 10,021,857 B2 | 7/2018 | Bailey et al. |
| 10,039,263 B2 | 8/2018 | Teychene et al. |
| 10,045,511 B1 | 8/2018 | Yarden et al. |
| 10,064,391 B1 | 9/2018 | Riley |
| 10,091,972 B1 | 10/2018 | Jensen et al. |
| 10,231,442 B1 | 3/2019 | Chang et al. |
| 10,242,547 B1 | 3/2019 | Struhsaker et al. |
| 10,264,762 B1 | 4/2019 | Lamb |
| 10,352,759 B1 | 7/2019 | Jensen |
| 10,446,006 B1 | 10/2019 | Johnson, Jr. et al. |
| 10,512,430 B1 | 12/2019 | Hladio |
| 10,588,295 B1 | 3/2020 | Riley |
| 10,628,756 B1 | 4/2020 | Kuper et al. |
| 10,638,726 B1 | 5/2020 | Makarychev et al. |
| 10,691,674 B2 | 6/2020 | Leong et al. |
| 2001/0027751 A1 | 10/2001 | van den Berg |
| 2002/0010390 A1 | 1/2002 | Guice et al. |
| 2002/0021219 A1 | 2/2002 | Edwards |
| 2002/0091326 A1 | 7/2002 | Hashimoto et al. |
| 2002/0095828 A1 | 7/2002 | Koopman et al. |
| 2002/0154015 A1 | 10/2002 | Hixson |
| 2002/0158765 A1 | 10/2002 | Pape et al. |
| 2003/0004652 A1 | 1/2003 | Brunner et al. |
| 2003/0023517 A1 | 1/2003 | Marsh et al. |
| 2003/0062001 A1 | 4/2003 | Andersson |
| 2003/0066491 A1 | 4/2003 | Stampe |
| 2003/0144926 A1 | 7/2003 | Bodin et al. |
| 2003/0146284 A1 | 8/2003 | Schmit et al. |
| 2003/0149526 A1 | 8/2003 | Zhou et al. |
| 2003/0177025 A1 | 9/2003 | Curkendall et al. |
| 2003/0201931 A1 | 10/2003 | Durst et al. |
| 2003/0208157 A1 | 11/2003 | Eidson et al. |
| 2003/0221343 A1 | 12/2003 | Volk et al. |
| 2003/0229452 A1 | 12/2003 | Lewis |
| 2004/0066298 A1 | 4/2004 | Schmitt et al. |
| 2004/0078390 A1 | 4/2004 | Saunders |
| 2004/0118920 A1 | 6/2004 | He |
| 2004/0123810 A1 | 7/2004 | Lorton et al. |
| 2004/0177011 A1 | 9/2004 | Ramsay et al. |
| 2004/0201454 A1 | 10/2004 | Waterhouse et al. |
| 2005/0010333 A1 | 1/2005 | Lorton et al. |
| 2005/0026181 A1 | 2/2005 | Davis et al. |
| 2005/0097997 A1 | 5/2005 | Hile |
| 2005/0108912 A1 | 5/2005 | Bekker |
| 2005/0115508 A1 | 6/2005 | Little |
| 2005/0128086 A1 | 6/2005 | Brown et al. |
| 2005/0139168 A1 | 6/2005 | Light et al. |
| 2005/0145187 A1 | 7/2005 | Gray |
| 2005/0273117 A1 | 12/2005 | Teychene |
| 2005/0279287 A1 | 12/2005 | Kroeker |
| 2005/0284381 A1 | 12/2005 | Bell et al. |
| 2006/0011145 A1 | 1/2006 | Kates |
| 2006/0052986 A1 | 3/2006 | Rogers et al. |
| 2006/0064325 A1 | 3/2006 | Matsumoto et al. |
| 2006/0087440 A1 | 4/2006 | Klein |
| 2006/0106289 A1 | 5/2006 | Elser et al. |
| 2006/0117619 A1 | 6/2006 | Costantini |
| 2006/0155172 A1 | 7/2006 | Rugg |
| 2006/0170561 A1 | 8/2006 | Eyal |

(56) References Cited

U.S. PATENT DOCUMENTS

| | | |
|---|---|---|
| 2006/0173367 A1 | 8/2006 | Stuart et al. |
| 2006/0185605 A1 | 8/2006 | Renz et al. |
| 2006/0201436 A1 | 9/2006 | Kates |
| 2006/0207515 A1 | 9/2006 | Palett |
| 2006/0241521 A1 | 10/2006 | Cohen |
| 2006/0282274 A1 | 12/2006 | Bennett |
| 2006/0290514 A1 | 12/2006 | Sakama et al. |
| 2007/0006494 A1 | 1/2007 | Hayes et al. |
| 2007/0008155 A1 | 1/2007 | Trost et al. |
| 2007/0021660 A1 | 1/2007 | Delonzor et al. |
| 2007/0027375 A1 | 2/2007 | Melker et al. |
| 2007/0027377 A1 | 2/2007 | Delonzor et al. |
| 2007/0027379 A1 | 2/2007 | Delonzor et al. |
| 2007/0029381 A1 | 2/2007 | Braiman |
| 2007/0044317 A1 | 3/2007 | Critelli |
| 2007/0044732 A1 | 3/2007 | Araki et al. |
| 2007/0062457 A1 | 3/2007 | Bates et al. |
| 2007/0069899 A1 | 3/2007 | Shih et al. |
| 2007/0103296 A1 | 5/2007 | Paessel et al. |
| 2007/0149871 A1 | 6/2007 | Sarussi et al. |
| 2007/0152825 A1 | 7/2007 | August et al. |
| 2007/0222624 A1 | 9/2007 | Eicken et al. |
| 2007/0255124 A1 | 11/2007 | Pologe et al. |
| 2007/0258625 A1 | 11/2007 | Mirtsching |
| 2007/0283791 A1 | 12/2007 | Engvall et al. |
| 2007/0298421 A1 | 12/2007 | Jiang et al. |
| 2008/0001815 A1 | 1/2008 | Wang et al. |
| 2008/0004798 A1 | 1/2008 | Troxler et al. |
| 2008/0017126 A1 | 1/2008 | Adams et al. |
| 2008/0018481 A1 | 1/2008 | Zehavi |
| 2008/0021352 A1 | 1/2008 | Keegan et al. |
| 2008/0036610 A1 | 2/2008 | Hokuf et al. |
| 2008/0047177 A1 | 2/2008 | Hilpert |
| 2008/0055155 A1 | 3/2008 | Hensley et al. |
| 2008/0059263 A1 | 3/2008 | Stroman et al. |
| 2008/0061990 A1 | 3/2008 | Milnes et al. |
| 2008/0076988 A1 | 3/2008 | Sarussi et al. |
| 2008/0076992 A1 | 3/2008 | Hete et al. |
| 2008/0085522 A1 | 4/2008 | Meghen et al. |
| 2008/0097726 A1 | 4/2008 | Lorton et al. |
| 2008/0110406 A1 | 5/2008 | Anderson et al. |
| 2008/0146890 A1 | 6/2008 | LeBoeuf et al. |
| 2008/0173255 A1 | 7/2008 | Mainini et al. |
| 2008/0190202 A1 | 8/2008 | Kulach et al. |
| 2008/0190379 A1 | 8/2008 | Mainini et al. |
| 2008/0215484 A1 | 9/2008 | Oldham |
| 2008/0227662 A1 | 9/2008 | Stromberg et al. |
| 2008/0228105 A1 | 9/2008 | Howell et al. |
| 2008/0262326 A1 | 10/2008 | Hete et al. |
| 2008/0272908 A1 | 11/2008 | Boyd |
| 2008/0312511 A1 | 12/2008 | Osler et al. |
| 2009/0009388 A1 | 1/2009 | Wangrud |
| 2009/0020613 A1 | 1/2009 | Chang et al. |
| 2009/0025651 A1 | 1/2009 | Lalor |
| 2009/0058730 A1 | 3/2009 | Geissler et al. |
| 2009/0094869 A1 | 4/2009 | Geissler et al. |
| 2009/0102668 A1 | 4/2009 | Thompson et al. |
| 2009/0139462 A1 | 6/2009 | So |
| 2009/0149727 A1 | 6/2009 | Truitt et al. |
| 2009/0187392 A1 | 7/2009 | Riskey et al. |
| 2009/0255484 A1 | 10/2009 | Muelken |
| 2009/0312667 A1 | 12/2009 | Utsunomiya et al. |
| 2010/0012038 A1 | 1/2010 | Petersen |
| 2010/0018363 A1 | 1/2010 | Chervenak et al. |
| 2010/0030036 A1 | 2/2010 | Mottram et al. |
| 2010/0045468 A1 | 2/2010 | Geissler |
| 2010/0113902 A1 | 5/2010 | Hete et al. |
| 2010/0139575 A1 | 6/2010 | Duncan et al. |
| 2010/0160809 A1 | 6/2010 | Laurence et al. |
| 2010/0175625 A1 | 7/2010 | Klenotiz |
| 2010/0217102 A1 | 8/2010 | Leboeuf et al. |
| 2010/0228532 A1 | 9/2010 | Abdel-Azim |
| 2010/0250198 A1 | 9/2010 | Lorton et al. |
| 2010/0289639 A1 | 11/2010 | Gibson et al. |
| 2010/0315241 A1 | 12/2010 | Jow |
| 2010/0321182 A1 | 12/2010 | Wangrud |
| 2010/0321189 A1 | 12/2010 | Gibson et al. |
| 2010/0331739 A1 | 12/2010 | Afikim et al. |
| 2011/0018717 A1 | 1/2011 | Takahashi et al. |
| 2011/0061605 A1 | 3/2011 | Hardi et al. |
| 2011/0095089 A1 | 4/2011 | Kolton et al. |
| 2011/0121356 A1 | 5/2011 | Krawinkel et al. |
| 2011/0137185 A1 | 6/2011 | Hete et al. |
| 2011/0152876 A1 | 6/2011 | Vandeputte |
| 2011/0178423 A1 | 7/2011 | Hatch |
| 2011/0203144 A1 | 8/2011 | Junek et al. |
| 2011/0258130 A1 | 10/2011 | Grabiner et al. |
| 2011/0272470 A1 | 11/2011 | Baba et al. |
| 2011/0313264 A1 | 12/2011 | Hete |
| 2012/0009943 A1 | 1/2012 | Greenberg et al. |
| 2012/0068848 A1 | 3/2012 | Campbell et al. |
| 2012/0089152 A1 | 4/2012 | Lynd et al. |
| 2012/0092132 A1 | 4/2012 | Holme et al. |
| 2012/0111286 A1 | 5/2012 | Lee et al. |
| 2012/0112917 A1 | 5/2012 | Menachem et al. |
| 2012/0160181 A1 | 6/2012 | So |
| 2012/0175412 A1 | 7/2012 | Grabiner et al. |
| 2012/0204811 A1 | 8/2012 | Ryan |
| 2012/0236690 A1 | 9/2012 | Rader et al. |
| 2012/0291715 A1 | 11/2012 | Jiang et al. |
| 2012/0299731 A1 | 11/2012 | Triener |
| 2012/0325153 A1* | 12/2012 | Mostert ............... A01J 5/007 119/14.08 |
| 2012/0326862 A1 | 12/2012 | Kwak et al. |
| 2012/0326874 A1 | 12/2012 | Kwak et al. |
| 2013/0006065 A1 | 1/2013 | Yanai et al. |
| 2013/0014706 A1 | 1/2013 | Menkes |
| 2013/0046170 A1 | 2/2013 | Haynes |
| 2013/0113622 A1 | 5/2013 | Pratt et al. |
| 2013/0119142 A1 | 5/2013 | McCoy et al. |
| 2013/0175347 A1 | 7/2013 | Decaluwe et al. |
| 2013/0192526 A1 | 8/2013 | Mainini |
| 2013/0211773 A1 | 8/2013 | Loeschinger et al. |
| 2013/0222141 A1 | 8/2013 | Rhee et al. |
| 2013/0237778 A1 | 9/2013 | Rouquette et al. |
| 2013/0239904 A1 | 9/2013 | Kim et al. |
| 2013/0239907 A1 | 9/2013 | Laurence et al. |
| 2013/0265165 A1 | 10/2013 | So et al. |
| 2013/0285815 A1 | 10/2013 | Jones, II |
| 2014/0073486 A1 | 3/2014 | Ahmed et al. |
| 2014/0122488 A1 | 5/2014 | Jung et al. |
| 2014/0123912 A1 | 5/2014 | Menkes et al. |
| 2014/0135596 A1 | 5/2014 | Leboeuf et al. |
| 2014/0135631 A1 | 5/2014 | Brumback et al. |
| 2014/0171762 A1 | 6/2014 | Leboeuf et al. |
| 2014/0174376 A1 | 6/2014 | Touchton et al. |
| 2014/0196673 A1 | 7/2014 | Menkes et al. |
| 2014/0230755 A1 | 8/2014 | Trenkle et al. |
| 2014/0232541 A1 | 8/2014 | Trenkle et al. |
| 2014/0253709 A1 | 9/2014 | Bresch et al. |
| 2014/0261235 A1 | 9/2014 | Rich et al. |
| 2014/0267299 A1 | 9/2014 | Couse |
| 2014/0275824 A1 | 9/2014 | Couse |
| 2014/0276089 A1 | 9/2014 | Kirenko et al. |
| 2014/0290013 A1 | 10/2014 | Eidelman et al. |
| 2014/0302783 A1 | 10/2014 | Aiuto et al. |
| 2014/0331942 A1 | 11/2014 | Sarazyn |
| 2014/0333439 A1 | 11/2014 | Downing et al. |
| 2014/0347184 A1 | 11/2014 | Triener |
| 2014/0352632 A1 | 12/2014 | McLaughlin |
| 2014/0368338 A1 | 12/2014 | Rettedal et al. |
| 2015/0025394 A1 | 1/2015 | Hong et al. |
| 2015/0039239 A1 | 2/2015 | Shuler et al. |
| 2015/0057963 A1 | 2/2015 | Zakharov et al. |
| 2015/0097668 A1 | 4/2015 | Toth |
| 2015/0099472 A1 | 4/2015 | Ickovic |
| 2015/0100245 A1 | 4/2015 | Huang et al. |
| 2015/0107519 A1 | 4/2015 | Rajkondawar et al. |
| 2015/0107522 A1 | 4/2015 | Lamb |
| 2015/0122893 A1 | 5/2015 | Warther |
| 2015/0128873 A1 | 5/2015 | Prescott et al. |
| 2015/0130617 A1 | 5/2015 | Triener |
| 2015/0148811 A1 | 5/2015 | Swope et al. |
| 2015/0157435 A1 | 6/2015 | Chasins et al. |

(56) References Cited

U.S. PATENT DOCUMENTS

| | | |
|---|---|---|
| 2015/0182322 A1 | 7/2015 | Couse et al. |
| 2015/0245592 A1 | 9/2015 | Sibbald et al. |
| 2015/0282457 A1 | 10/2015 | Yarden |
| 2015/0334994 A1 | 11/2015 | Prasad |
| 2015/0342143 A1 | 12/2015 | Stewart |
| 2015/0351885 A1 | 12/2015 | Kool et al. |
| 2015/0366166 A1 | 12/2015 | Mueller |
| 2016/0000045 A1 | 1/2016 | Funaya et al. |
| 2016/0021506 A1 | 1/2016 | Bonge, Jr. |
| 2016/0058379 A1 | 3/2016 | Menkes et al. |
| 2016/0066546 A1 | 3/2016 | Borchersen et al. |
| 2016/0100802 A1 | 4/2016 | Newman |
| 2016/0106064 A1 | 4/2016 | Bladen et al. |
| 2016/0113524 A1 | 4/2016 | Gross et al. |
| 2016/0120154 A1 | 5/2016 | Hill et al. |
| 2016/0128637 A1 | 5/2016 | Leboeuf et al. |
| 2016/0135431 A1 | 5/2016 | John |
| 2016/0148086 A1 | 5/2016 | Clarke et al. |
| 2016/0150362 A1 | 5/2016 | Shaprio et al. |
| 2016/0151013 A1 | 6/2016 | Atallah et al. |
| 2016/0165851 A1 | 6/2016 | Harty et al. |
| 2016/0165852 A1 | 6/2016 | Goldfain et al. |
| 2016/0166761 A1 | 6/2016 | Piehl et al. |
| 2016/0198957 A1 | 7/2016 | Arditi et al. |
| 2016/0210841 A1 | 7/2016 | Huang et al. |
| 2016/0213317 A1 | 7/2016 | Richardson et al. |
| 2016/0278712 A1 | 9/2016 | Sagara et al. |
| 2016/0286757 A1 | 10/2016 | Armstrong |
| 2016/0287108 A1 | 10/2016 | Wei et al. |
| 2016/0317049 A1 | 11/2016 | Leboeuf et al. |
| 2016/0345881 A1 | 12/2016 | Sarantos et al. |
| 2016/0360733 A1 | 12/2016 | Triener |
| 2016/0367495 A1 | 12/2016 | Miller et al. |
| 2017/0000090 A1 | 1/2017 | Hall |
| 2017/0006836 A1 | 1/2017 | Torres |
| 2017/0042119 A1 | 2/2017 | Garrity |
| 2017/0067770 A1 | 3/2017 | Sun |
| 2017/0079247 A1 | 3/2017 | Womble et al. |
| 2017/0095206 A1 | 4/2017 | Leib et al. |
| 2017/0156288 A1 | 6/2017 | Singh |
| 2017/0164905 A1 | 6/2017 | Gumiero |
| 2017/0193208 A1 | 7/2017 | Ashley et al. |
| 2017/0196203 A1 | 7/2017 | Huisma et al. |
| 2017/0202185 A1 | 7/2017 | Trumbull et al. |
| 2017/0245797 A1 | 8/2017 | Quinn |
| 2017/0258039 A1 | 9/2017 | Lauterbach |
| 2017/0272842 A1 | 9/2017 | Touma et al. |
| 2017/0280675 A1 | 10/2017 | MacNeil et al. |
| 2017/0280688 A1 | 10/2017 | Deliou et al. |
| 2017/0318781 A1 | 11/2017 | Rollins et al. |
| 2017/0360004 A1 | 12/2017 | Carver |
| 2017/0372583 A1 | 12/2017 | Lamkin et al. |
| 2018/0000045 A1 | 1/2018 | Bianchi et al. |
| 2018/0007863 A1 | 1/2018 | Bailey et al. |
| 2018/0014512 A1 | 1/2018 | Arabani et al. |
| 2018/0055016 A1 | 3/2018 | Hsieh et al. |
| 2018/0064068 A1 | 3/2018 | McKee et al. |
| 2018/0070559 A1 | 3/2018 | So |
| 2018/0098522 A1 | 4/2018 | Steinfort |
| 2018/0110205 A1 | 4/2018 | Czarnecky et al. |
| 2018/0131074 A1 | 5/2018 | Wilkinson et al. |
| 2018/0132455 A1 | 5/2018 | Pradeep et al. |
| 2018/0206455 A1 | 7/2018 | Thiex et al. |
| 2018/0242860 A1 | 8/2018 | Leboeuf et al. |
| 2018/0249683 A1 | 9/2018 | Borchersen et al. |
| 2018/0260976 A1 | 9/2018 | Watanabe et al. |
| 2018/0271058 A1 | 9/2018 | Valdez |
| 2018/0279582 A1 | 10/2018 | Yajima et al. |
| 2018/0288968 A1 | 10/2018 | Cisco |
| 2018/0295809 A1 | 10/2018 | Yajima et al. |
| 2018/0303425 A1 | 10/2018 | Wordham et al. |
| 2018/0310526 A1 | 11/2018 | Birch et al. |
| 2018/0325382 A1 | 11/2018 | Brandao et al. |
| 2018/0332989 A1 | 11/2018 | Chiu et al. |
| 2018/0333244 A1 | 11/2018 | Hanks et al. |
| 2019/0008118 A1 | 1/2019 | Keegan |
| 2019/0008124 A1 | 1/2019 | Komatsu et al. |
| 2019/0029226 A1 | 1/2019 | Triener |
| 2019/0053469 A1 | 2/2019 | Mardirossian |
| 2019/0053470 A1 | 2/2019 | Singh et al. |
| 2019/0059335 A1 | 2/2019 | Crider, Jr. et al. |
| 2019/0059337 A1 | 2/2019 | Robbins |
| 2019/0059741 A1 | 2/2019 | Crider, Jr. et al. |
| 2019/0069512 A1 | 3/2019 | Eriksson et al. |
| 2019/0075945 A1 | 3/2019 | Strassburger et al. |
| 2019/0082654 A1 | 3/2019 | Robbins |
| 2019/0090754 A1 | 3/2019 | Brandao et al. |
| 2019/0110433 A1 | 4/2019 | Myers |
| 2019/0110436 A1 | 4/2019 | Gardner et al. |
| 2019/0125509 A1 | 5/2019 | Hotchkin |
| 2019/0130728 A1 | 5/2019 | Struhsaker et al. |
| 2019/0133086 A1 | 5/2019 | Katz et al. |
| 2019/0159428 A1 | 5/2019 | Bolen |
| 2019/0166802 A1 | 6/2019 | Seltzer et al. |
| 2019/0183091 A1 | 6/2019 | Betts-Lacroix et al. |
| 2019/0183092 A1 | 6/2019 | Couse et al. |
| 2019/0208358 A1 | 7/2019 | De Barros et al. |
| 2019/0213860 A1 | 7/2019 | Shaprio et al. |
| 2019/0254599 A1 | 8/2019 | Young et al. |
| 2019/0287429 A1 | 9/2019 | Dawson et al. |
| 2019/0290133 A1 | 9/2019 | Crider et al. |
| 2019/0290847 A1 | 9/2019 | Veyrent et al. |
| 2019/0298226 A1 | 10/2019 | Filipowicz |
| 2019/0298924 A1 | 10/2019 | Gibson et al. |
| 2019/0327939 A1 | 10/2019 | Sharpe et al. |
| 2019/0335715 A1 | 11/2019 | Hicks et al. |
| 2019/0350168 A1 | 11/2019 | Shi |
| 2019/0365324 A1 | 12/2019 | Chang |
| 2019/0373857 A1 | 12/2019 | Leigh-Lancaster et al. |
| 2019/0380311 A1 | 12/2019 | Crouthamel et al. |
| 2019/0385037 A1 | 12/2019 | Robadey et al. |
| 2019/0385332 A1 | 12/2019 | Yajima et al. |
| 2020/0015740 A1 | 1/2020 | Alnofeli et al. |
| 2020/0037886 A1 | 2/2020 | Greer et al. |
| 2020/0068853 A1 | 3/2020 | Radovcic |
| 2020/0085019 A1 | 3/2020 | Gilbert et al. |
| 2020/0100463 A1 | 4/2020 | Rooda et al. |
| 2020/0107522 A1 | 4/2020 | Kersey et al. |
| 2020/0110946 A1 | 4/2020 | Kline et al. |
| 2020/0113728 A1 | 4/2020 | Spector et al. |
| 2020/0170222 A1 | 6/2020 | Gotts |
| 2020/0178505 A1 | 6/2020 | Womble et al. |
| 2020/0178800 A1 | 6/2020 | Geissler et al. |
| 2020/0205381 A1 | 7/2020 | Wernimont et al. |
| 2020/0229391 A1 | 7/2020 | De Groot |
| 2020/0229707 A1 | 7/2020 | Donnelly |
| 2020/0242551 A1 | 7/2020 | Lau et al. |
| 2020/0281151 A1* | 9/2020 | Schmidt ............ A01K 11/006 |

FOREIGN PATENT DOCUMENTS

| | | |
|---|---|---|
| AU | 2003238759 | 1/2004 |
| AU | 2004263067 | 2/2005 |
| AU | 2004305403 | 7/2005 |
| AU | 2011210083 | 8/2011 |
| AU | 2016266101 | 12/2016 |
| AU | 2017100469 | 5/2017 |
| AU | 2018220079 | 9/2018 |
| BR | 8701673 | 3/2009 |
| BR | 112012018909 | 1/2011 |
| CA | 2267812 | 10/2000 |
| CA | 2493331 | 1/2005 |
| CA | 2788153 | 8/2011 |
| CA | 2880138 | 2/2013 |
| CA | 2858905 | 10/2013 |
| CA | 2875637 | 1/2014 |
| CA | 2875578 | 12/2014 |
| CA | 2915843 | 12/2014 |
| CA | 2990620 | 12/2016 |
| CA | 2916286 | 6/2017 |
| CA | 3007296 | 6/2017 |
| CN | 1989895 | 7/2007 |
| CN | 201171316 | 12/2008 |
| CN | 101578516 | 11/2009 |

(56) References Cited

FOREIGN PATENT DOCUMENTS

| | | |
|---|---|---|
| CN | 101816290 | 9/2010 |
| CN | 101875975 | 11/2010 |
| CN | 101875976 | 11/2010 |
| CN | 102781225 | 1/2011 |
| CN | 102142116 | 8/2011 |
| CN | 102395266 A | 3/2012 |
| CN | 102485892 | 6/2012 |
| CN | 102682322 | 9/2012 |
| CN | 203313865 | 12/2013 |
| CN | 203689049 | 2/2014 |
| CN | 203523519 | 4/2014 |
| CN | 204047531 | 8/2014 |
| CN | 204305813 | 5/2015 |
| CN | 204331349 | 5/2015 |
| CN | 204335503 U | 5/2015 |
| CN | 105191817 | 12/2015 |
| CN | 106125648 | 11/2016 |
| CN | 106172068 | 12/2016 |
| CN | 106197675 | 12/2016 |
| CN | 106719037 | 2/2017 |
| CN | 205919898 | 2/2017 |
| CN | 106472347 | 3/2017 |
| CN | 106845598 | 6/2017 |
| CN | 206431665 | 8/2017 |
| CN | 107201409 | 9/2017 |
| CN | 207201674 | 9/2017 |
| CN | 107251851 | 10/2017 |
| CN | 107667898 | 2/2018 |
| CN | 108353810 | 2/2018 |
| CN | 207100094 | 3/2018 |
| CN | 207249710 | 4/2018 |
| CN | 108651301 | 5/2018 |
| CN | 108656996 | 5/2018 |
| CN | 108684549 | 5/2018 |
| CN | 108118096 | 6/2018 |
| CN | 108308055 | 7/2018 |
| CN | 109006541 | 8/2018 |
| CN | 109008529 | 8/2018 |
| CN | 108617533 | 10/2018 |
| CN | 108717668 | 10/2018 |
| CN | 108766586 | 11/2018 |
| CN | 109006550 | 12/2018 |
| CN | 208273869 | 12/2018 |
| CN | 109355402 | 2/2019 |
| CN | 109937904 | 3/2019 |
| CN | 109937905 | 3/2019 |
| CN | 109823691 | 5/2019 |
| CN | 110073995 | 5/2019 |
| CN | 110059781 | 7/2019 |
| CN | 110106261 | 8/2019 |
| CN | 110106262 | 8/2019 |
| CN | 110506656 | 11/2019 |
| CN | 210076292 | 2/2020 |
| DE | 633742 | 8/1936 |
| DE | 2850438 | 5/1980 |
| DE | 19629166 | 2/1997 |
| DE | 19826348 | 6/1998 |
| DE | 29906146 | 6/1999 |
| DE | 19911766 | 9/2000 |
| DE | 20018364 | 1/2001 |
| DE | 10001176 | 5/2001 |
| DE | 102004027978 | 12/2005 |
| DE | 202010008325 | 2/2012 |
| DE | 202013011075 | 1/2014 |
| DE | 202016101289 | 4/2016 |
| DK | 140001 | 11/1979 |
| EP | 55127 | 6/1982 |
| EP | 125915 | 11/1984 |
| EP | 0499428 | 8/1992 |
| EP | 513525 | 11/1992 |
| EP | 743043 | 11/1996 |
| EP | 938841 | 2/1998 |
| EP | 898449 | 3/1999 |
| EP | 1076485 | 2/2001 |
| EP | 1445723 | 8/2004 |
| EP | 1479338 | 11/2004 |
| EP | 1521208 | 4/2005 |
| EP | 1907816 | 4/2008 |
| EP | 1961294 | 8/2008 |
| EP | 2028931 | 3/2009 |
| EP | 2172878 | 4/2010 |
| EP | 2528431 | 1/2011 |
| EP | 2453733 | 5/2012 |
| EP | 2465344 | 6/2012 |
| EP | 2488237 | 8/2012 |
| EP | 2528431 | 12/2012 |
| EP | 2534945 | 12/2012 |
| EP | 2657889 | 10/2013 |
| EP | 2664234 | 11/2013 |
| EP | 2728995 | 5/2014 |
| EP | 2879615 | 6/2015 |
| EP | 2955998 | 12/2015 |
| EP | 3153098 | 4/2017 |
| EP | 3164855 | 5/2017 |
| EP | 3210531 | 8/2017 |
| EP | 3217566 | 9/2017 |
| EP | 3218865 | 9/2017 |
| EP | 3225106 | 10/2017 |
| EP | 3316680 | 5/2018 |
| EP | 3346422 | 7/2018 |
| EP | 3385886 | 10/2018 |
| EP | 3593634 | 1/2020 |
| EP | 3627856 | 3/2020 |
| EP | 3660855 | 6/2020 |
| ES | 2046912 | 2/1994 |
| ES | 2206009 | 5/2004 |
| ES | 2215152 | 10/2004 |
| ES | 1072416 | 7/2010 |
| ES | 2391341 | 11/2012 |
| ES | 1194609 | 10/2017 |
| FI | 20165318 | 6/2017 |
| FR | 2106705 | 5/1972 |
| FR | 2297565 | 8/1976 |
| FR | 2342024 | 1/1983 |
| FR | 2601848 | 1/1988 |
| FR | 2779153 | 12/1999 |
| FR | 2834521 | 7/2003 |
| FR | 2964777 | 3/2012 |
| FR | 3046332 | 1/2016 |
| FR | 3024653 | 2/2016 |
| FR | 3085249 | 9/2018 |
| GB | 588870 | 6/1947 |
| GB | 641394 | 8/1950 |
| GB | 865164 | 4/1961 |
| GB | 1072971 | 6/1967 |
| GB | 1267830 | 3/1972 |
| GB | 1415650 | 11/1975 |
| GB | 2067121 | 7/1981 |
| GB | 2055670 | 7/1983 |
| GB | 2114045 | 8/1983 |
| GB | 2125343 | 3/1984 |
| GB | 2142812 | 1/1985 |
| GB | 2392138 | 2/2004 |
| GB | 2469326 | 10/2010 |
| GB | 2554636 | 9/2016 |
| GB | 2554636 | 4/2018 |
| GB | 2570340 | 7/2019 |
| GB | 2571404 | 8/2019 |
| IN | 201103443 | 12/2011 |
| IN | 200802272 | 6/2016 |
| JP | 57173562 | 11/1982 |
| JP | 7177832 | 7/1995 |
| JP | 2001178692 | 7/2001 |
| JP | 2004292151 | 10/2004 |
| JP | 2005102959 | 4/2005 |
| JP | 5659243 | 1/2011 |
| JP | 2011067178 | 4/2011 |
| JP | 2011087657 | 5/2011 |
| JP | 2013247941 | 6/2012 |
| JP | 2017112857 | 6/2017 |
| JP | 2017002170 | 4/2018 |
| KR | 2003061157 | 7/2003 |
| KR | 2005046330 | 5/2005 |
| KR | 780449 | 11/2007 |

(56) References Cited

FOREIGN PATENT DOCUMENTS

| | | |
|---|---|---|
| KR | 20130019970 | 2/2013 |
| KR | 20130057683 | 6/2013 |
| KR | 2013138899 | 12/2013 |
| KR | 2019061805 | 11/2017 |
| KR | 101827311 | 2/2018 |
| KR | 20180035537 | 4/2018 |
| KR | 2018109451 | 10/2018 |
| KR | 20190081598 | 7/2019 |
| KR | 2019091708 | 8/2019 |
| MX | 9600754 | 2/1997 |
| MX | 356331 | 1/2011 |
| NL | 2017104 | 1/2018 |
| NL | 2019186 | 1/2019 |
| NL | 2020275 | 7/2019 |
| NZ | 198486 | 5/1986 |
| NZ | 199494 | 7/1986 |
| NZ | 203924 | 10/1986 |
| NZ | 335702 | 3/2001 |
| NZ | 507129 | 8/2002 |
| NZ | 582984 | 1/2011 |
| NZ | 101747418 | 1/2011 |
| RU | 2178711 | 1/2002 |
| RU | 2265324 | 12/2005 |
| SE | 4567 | 3/1893 |
| SE | 5549 | 4/1894 |
| SE | 123213 | 11/1948 |
| SE | 188102 | 3/1964 |
| SU | 1766336 | 10/1992 |
| WO | 1984000468 | 2/1984 |
| WO | 1991011956 | 8/1991 |
| WO | 199302549 | 2/1993 |
| WO | 199822028 | 5/1998 |
| WO | 1998039475 | 9/1998 |
| WO | 1999017658 | 4/1999 |
| WO | 2000062263 | 4/1999 |
| WO | 9945761 | 9/1999 |
| WO | 2000013393 | 3/2000 |
| WO | 2000061802 | 10/2000 |
| WO | 2001033950 | 5/2001 |
| WO | 2001087054 | 11/2001 |
| WO | 2002031629 | 4/2002 |
| WO | 2002085106 | 10/2002 |
| WO | 2003001180 | 1/2003 |
| WO | 2004092920 | 3/2003 |
| WO | 2003087765 | 10/2003 |
| WO | 2003094605 | 11/2003 |
| WO | 2004015655 | 2/2004 |
| WO | 2005104775 | 4/2004 |
| WO | 2006078943 | 1/2005 |
| WO | 2005104930 | 4/2005 |
| WO | 2005073408 | 8/2005 |
| WO | 2006021855 | 3/2006 |
| WO | 2006134197 | 12/2006 |
| WO | 2006135265 | 12/2006 |
| WO | 2007034211 | 3/2007 |
| WO | 2007095684 | 8/2007 |
| WO | 2007122375 | 11/2007 |
| WO | 2008033042 | 3/2008 |
| WO | 2008041839 A1 | 4/2008 |
| WO | WO2008041839 A1 | 4/2008 |
| WO | 2008052298 | 5/2008 |
| WO | 2008075974 | 6/2008 |
| WO | 2010091686 | 12/2008 |
| WO | 2009034497 | 3/2009 |
| WO | 2009062249 | 5/2009 |
| WO | 2009076325 | 6/2009 |
| WO | 2009089215 | 7/2009 |
| WO | 2009117764 | 10/2009 |
| WO | 2009153779 | 12/2009 |
| WO | 2010008620 | 1/2010 |
| WO | 2010048753 | 5/2010 |
| WO | 2010053811 | 5/2010 |
| WO | 2010068713 | 6/2010 |
| WO | 2010140900 | 12/2010 |
| WO | 2012075480 | 12/2010 |
| WO | 2011039112 | 4/2011 |
| WO | 2011076886 | 6/2011 |
| WO | 2011154949 | 12/2011 |
| WO | 2012071670 | 6/2012 |
| WO | 2013008115 | 1/2013 |
| WO | 2013038326 | 3/2013 |
| WO | 2013082227 | 6/2013 |
| WO | 2015001537 | 7/2013 |
| WO | 2013118121 | 8/2013 |
| WO | 2015024050 | 8/2013 |
| WO | 2013179020 | 12/2013 |
| WO | 2013190423 | 12/2013 |
| WO | 2014020463 | 2/2014 |
| WO | 2014095759 | 6/2014 |
| WO | 2014107766 | 7/2014 |
| WO | 2014118788 | 8/2014 |
| WO | 2014125250 | 8/2014 |
| WO | 2016027271 | 8/2014 |
| WO | 2014140148 | 9/2014 |
| WO | 2014141084 | 9/2014 |
| WO | 2014194383 | 12/2014 |
| WO | 2014197631 | 12/2014 |
| WO | 2014199363 | 12/2014 |
| WO | 2015009167 | 1/2015 |
| WO | 2015030832 | 3/2015 |
| WO | 2015055709 | 4/2015 |
| WO | 2015086338 | 6/2015 |
| WO | 2016207844 | 6/2015 |
| WO | 2015107354 | 7/2015 |
| WO | 2017001717 | 7/2015 |
| WO | 2017031532 | 8/2015 |
| WO | 2015140486 | 9/2015 |
| WO | 2015158787 | 10/2015 |
| WO | 2015175686 | 11/2015 |
| WO | 2015176027 | 11/2015 |
| WO | 2015197385 | 12/2015 |
| WO | 2016037190 | 3/2016 |
| WO | 2017149049 | 3/2016 |
| WO | 2016053104 | 4/2016 |
| WO | 2016108187 | 7/2016 |
| WO | 2016166748 | 10/2016 |
| WO | 2017001538 | 1/2017 |
| WO | 2017027551 | 2/2017 |
| WO | 2017037479 | 3/2017 |
| WO | 2017066813 | 4/2017 |
| WO | 2017089289 | 6/2017 |
| WO | 2017096256 | 6/2017 |
| WO | 2017121834 | 7/2017 |
| WO | 2018006965 | 1/2018 |
| WO | 2018011736 | 1/2018 |
| WO | 2018019742 | 2/2018 |
| WO | 2020022543 | 7/2018 |
| WO | 2018172976 | 9/2018 |
| WO | 2020060248 | 9/2018 |
| WO | 2018203203 | 11/2018 |
| WO | 2019009717 | 1/2019 |
| WO | 2019025138 | 2/2019 |
| WO | 2019046216 | 3/2019 |
| WO | 2019058752 | 3/2019 |
| WO | WO2019048521 A1 | 3/2019 |
| WO | 2019071222 | 4/2019 |
| WO | 2019132803 | 7/2019 |
| WO | 2019207561 | 10/2019 |
| WO | 2019235942 | 12/2019 |
| WO | 2019245978 | 12/2019 |
| WO | 2020003310 | 1/2020 |
| WO | 2020096528 | 5/2020 |
| WO | 2020140013 | 7/2020 |

OTHER PUBLICATIONS

Steensels, Machteld; Maltz, Ephraim; Bahr, Claudia; Berckmans, Daniel; Antler, Aharon; et al., Towards practical application of sensors for monitoring animal health: The effect of post-calving health problems on rumination duration, activity and milk yield, The Journal of Dairy Research; Cambridge vol. 84, Iss. 2, (May 2017): 132-138.

(56) References Cited

OTHER PUBLICATIONS

Clark, C., Lyons, N., Millapan, L., Talukder, S., Cronin, G., Kerrisk, K., & Garcia, S. (2015), Rumination and activity levels as predictors of calving for dairy cows, Animal, 9(4), 691-695.

K. Koyama, T. Koyama, M. Sugimoto, N. Kusakari, R. Miura, K. Yoshioka, M. Hirako, Prediction of calving time in Holstein dairy cows by monitoring the ventral tail base surface temperature, The Veterinary Journal, vol. 240, 2018, pp. 1-5, ISSN 1090-0233.

L. Calamari, N. Soriani, G. Panella, F. Petrera, A. Minuti, E. Trevisi, Rumination time around calving: An early signal to detect cows at greater risk of disease, Journal of Dairy Science, vol. 97, Issue 6, 2014, pp. 3635-3647, ISSN 0022-0302.

S. Benaissa, F.A.M. Tuyttens, D. Plets, J. Trogh, L. Martens, L. Vandaele, W. Joseph, B. Sonck, Calving and estrus detection in dairy cattle using a combination of indoor localization and accelerometer sensors, Computers and Electronics in Agriculture, vol. 168, 2020, 105153, ISSN 0168-1699.

N. Soriani, E. Trevisi, L. Calamari, Relationships between rumination time, metabolic conditions, and health status in dairy cows during the transition period, Journal of Animal Science, vol. 90, Issue 12, Dec. 2012, pp. 4544-4554.

The role of sensors, big data and machine learning in modern animal farming; Suresh Neethirajan; Received Jun. 2, 2020; Received in revised form Jun. 30, 2020; Accepted Jul. 3, 2020 Sensing and Bio-Sensing Research 29 (2020) 1003672214-1804/ © 2020 The Author. Published by Elsevier B.V.

A Review on Determination of Computer Aid Diagnosis and/or Risk Factors Using Data Mining Methods in Veterinary Field Pinar Cihan, Erhan Göçe, Oya Kalupsiz; Tekirdağ Namik Kemal University, Çorlu Faculty of Engineering, Department of Computer Engineering, Tekirdağ, Turkey. 2019.

Big Data Analytics and Precision Animal Agriculture Symposium: Data to decisions B. J. White, D. E. Amrine, and R. L. Larson Beef Cattle Institute, Kansas State University, Manhattan, KS; © The Author(s) 2018. Published by Oxford University Press on behalf of American Society of Animal Science.

Gasteiner, J.; Boswerger, B.; Guggenberger, T., Practical use of a novel ruminal sensor on dairy farms, Praktische Tierarzt 2012 vol. 93 No. 8 p. 730 . . . 739 ref.45.

Drying up Cows and The Effect of Different Methods Upon Milk Production; Ralph Wayne, C. H. Eckles, and W. E. Peterson; Division of Dairy Husbandry, University of Minnesota, St. Paul; Research-Article| vol. 16, Issue 1, p. 69-78, Jan. 1, 1933.

Wayne R et al, "Drying up cows and the effect of different methods upon milk production", Journal of Dairy Science, vol. 16, No. 1, pp. 69-78 DOI: https://doi.org/10.3168/jds.S0022-0302(33)93317-2.

\* cited by examiner

LIVESTOCK DRY OFF METHOD AND DEVICE

FIELD OF THE INVENTION

The present invention generally pertains to a system and method for drying off dairy animals such as cows.

BACKGROUND OF THE INVENTION

It is well known that, in order to maintain milk production over several lactations, dairy animals, for example cows, need to have a dry period, where they produce no milk, between lactations. It has been found that, in cows, an optimum length for this dry period is typically about 60 days before expected calving.

Drying-off a dairy animal typically involves at least one of the following: simply stopping milking the dairy animal on a certain day, or, when an effort is made to relieve stress, including one of the following strategies: increasing the time between milkings prior to the final dry-off, or not fully emptying the udder at each milking during a certain period before the final dry-off. In any of the above cases, the excess milk in the udder will decrease milk production and eventually completely stop milk production. The desired dry period can then commence.

However, in the last decades, genetic improvements in dairy cattle as well as other factors have increased the milk yield of cows and have led to a situation in which, in many cases, cows that are due to be dried-off still produce a considerable amount of milk 60 days before the next calving and the process of dry-off leads to great stress in the dairy animal, which may lead to a number of complications that can occur during the drying-off period:

- There is, especially at the start of the drying-off period, when the cow's milk production is still high, a significantly increased pressure in the udder from excess milk accumulated during a longer time between milking or from not fully emptying the udder.
- The increased pressure in the udder can cause discomfort and pain to the dairy animal.
- The increased pressure in the udder can cause leakage of milk from the teats. Milk leakage increases the probability of infection of the udder.
- Leakage from the teats can prevent the formation of a protective plug in the teat canal, a normal part of the drying-off process, which itself protects the udder from infection.
- Proper formation of a teat plug is important for udder health and to improve milk production in a subsequent lactation cycle.

Prophylactic application of antibiotics is often used to prevent infections in the udder, but these are less desirable since they increase the cost of caring for the dairy animal and can increase antibiotic resistance in bacteria. In addition, there is a cost associated with prophylactic application of antibiotics, which includes both the cost of the antibiotics themselves and the manpower cost of applying them.

If there appears to be failure to form a normal teat plug, artificial teat plugs can be applied, again increasing the cost of caring for the dairy animal.

A number of regimens are recommended for drying-off cows.

Oregon State University (http://smallfarms.oregonstate.edu/sfn/sul0dryinglivestock) recommends the following regimen for drying-off dairy animals:

- Reduce nutrient content of diet for about 2 weeks to reduce milk production (provide plenty of low-calorie feed and plenty of water).
- After production is less than 20 lb/day in cows and 3 lb per day in goats, or after 2 weeks, stop milking.
- Wash with alcohol, apply antibiotic and cover with a teat dip if there is a history of mastitis.

The New Zealand dairy industry organization DairyNZ (https://www.dairvnz.co.nz/animal/cow-health/mastitis/drying-off) recommends drying-off cows as soon as their milk production reaches 5 liters or less per day. The recommended regimen is:

- Milk out as usual at a last milking.
- Administer antibiotic dry cow therapy (DCT).
- Administer Internal Teat Sealants (ITS).
- Cover the whole surface of the teat with freshly prepared teat disinfectant.
- For the next 1-2 weeks, cows should be grazed in paddocks that are well away from the milking herd and the milking area, so the cows don't have a stimulus to let down milk
- Feed a "maintenance" diet for the first 7-14 days after dry off.
- Cows should be maintained on the "maintenance" daily dry matter (DM) intakes for a maximum of 14 days after dry off. For many low-yielding cows, this period can be shortened to about 7 days, depending on how quickly the swelling in the udders starts to subside. Maintenance is about 8 kg DM/day.

Other dry-off regimens reduce the frequency of milking; the cow is fully milked at each milking, but the frequency of milking is gradually reduced, over a period of about 2 weeks, until the cow is dry. For example, the milking frequency can be reduced from 2-3 per day to 1 per day, then to one every other day, until the cow is dry. In some regimens, antibiotics, teat sealants or both are also used. These regimens require special consideration to prevent treated animals from being milked by mistake and contaminating the entire volume of milk, which can have a severe consequences to the framer.

Automated, computerized systems of managing dairy animal dry-off have been proposed.

WIPO application publication number WO07089184 discloses a dairy farm management support system with an input interface, a rules engine, a decision engine and an output interface for presenting at least one proposed dairy farm decision to a user. The rules engine receives a first set of input parameters, $D_{r_a}nd$, which reflect a decision basis for a particular type of dairy farm decision. Via the input interface, the rules engine also receives user-generated input data, $Dec_u$, which represent a number of manual decisions in respect of the first set of input parameters $D_{r_a}nd$. In response to the first set of input parameters $D_{r_a}nd$ and the accompanying user-generated input data $Dec_u$, the rules engine generates a set of decision rules $R_{D_{ec}}$. Then the decision engine receives dairy farm data (D) reflecting animal parameters of the same type as the first set of input parameters $_{Drand}$, applies the set of decision rules $R_{Dec}$ to the dairy farm data (D) and derives at least one proposed dairy farm decision of the particular type, which is presented via the output interface. Data for each individual animal can be collected, e.g. amount of milk produced and animal condition data. From automatically-generated data and manually-entered data, a set of rules can be generated to inform a user of a regimen to be followed. For example, from the generated rules, a user can be advised on whether or not to start a dry-off regimen.

However, WO07089184 does not disclose any means or method by which a drying-off regimen can be automatically executed, not does it suggest any particular drying-off regimen to be used.

It is therefore a long felt need to provide a means and method which is not difficult to implement and by which a dairy animal can be dried off which minimizes discomfort to the dairy animal, which minimizes leakage of milk from the teats, which minimizes necessity for antibiotics, which limits the need for artificial teat plugs, and which avoids reduction in milk yield during subsequent lactations.

SUMMARY OF THE INVENTION

It is an object of the present invention to disclose an automated system and method for drying-off dairy animals.

It is another object of the present invention to disclose a method for automatically drying-off a dairy animal, comprising steps of:
for a duration of gestation greater than a predetermined drying-off start time, determining average milk production for said dairy animal;
for said average milk production being greater than a predetermined amount of milk:
setting a start date for gradual drying-off as a current milking; and,
determining, from said start date and a predetermined drying-off period, a dry-off date;
wherein said gradual drying-off comprises:
for each current milking of said dairy animal on or after said start date:
determining an amount of milk to be removed in each milking;
machine milking said dairy animal;
measuring removal of milk in real time during milking; and,
at such time as said milk production is greater than said amount of milk to be removed, stopping said current milking.

It is another object of the present invention to disclose the method as described above, additionally comprising a step of: for said average milk production being less than or equal to said predetermined amount of milk, using abrupt dry-off by discontinuing milking.

It is another object of the present invention to disclose the method as described above, additionally comprising steps of: determining, from a current date and said dry-off date, a number of days until said dry-off date; and determining said amount of milk to be removed from said number of days until said dry-off date and said average milk production.

It is another object of the present invention to disclose the method as described above, wherein said amount of milk to be removed is independent of flow rate of milk from said dairy animal.

It is another object of the present invention to disclose the method as described above, wherein said average milk production is average daily milk production.

It is another object of the present invention to disclose the method as described above, additionally comprising a step of calculating said average milk production from milk production over a time period in a range between two weeks and a time interval from one milking to a next milking, said time interval including a single milking.

It is another object of the present invention to disclose the method as described above, additionally comprising a step of providing a system for milking said dairy animal, said dairy animal uniquely identifiable; said system comprising:

a milking controller configured to control said removal of milk from said dairy animal's udder;
at least one milk meter in communication with said milking controller, said at least one milk meter configured to measure an amount of said removal of milk; and
at least one milking processor, said milking processor configured to determine said amount of milk to be removed by said milking controller; said milking processor further configured to store, for said dairy animal, at least one previous amount of milk removed and to generate, for said dairy animal, said average milk production from said at least one previous amount of milk removed.

It is another object of the present invention to disclose the method as described above, additionally comprising a step of controlling initiation of said removal of milk.

It is another object of the present invention to disclose the method as described above, additionally comprising a step of selecting said control of initiation of said removal of milk from a group consisting of: manual control of initiation of said removal of milk, semi-automatic control of initiation of said removal of milk and automatic control of initiation of said removal of milk.

It is another object of the present invention to disclose the method as described above, additionally comprising a step of determining, from at least one other consideration, whether gradual drying-off is indicated.

It is another object of the present invention to disclose the method as described above, additionally comprising a step of selecting said at least one other consideration from a group consisting of: a dairy animal's health, feed a dairy animal is being given, a need to transition to another feed, pasture a dairy animal is on, a desire to change pasture, a need for milk, a dairy animal's lactation number and any combination thereof.

It is another object of the present invention to disclose the method as described above, additionally comprising steps of, for said at least one other consideration not indicating gradual drying-off, milking-out at each milking until either said average milk production is less than or equal to said predetermined amount of milk; and for said at least one other consideration indicating gradual drying-off, selecting abrupt dry-off for average milk production being less than or equal to said predetermined amount of milk and selecting gradual drying-off for average milk production being greater than said predetermined amount of milk.

It is another object of the present invention to disclose the method as described above, additionally comprising a step of identifying said dairy animal.

It is another object of the present invention to disclose the method as described above, additionally comprising a step of selecting said identifying of said dairy animal from a group consisting of: manual identification, automatic identification and any combination thereof.

It is another object of the present invention to disclose the method as described above, additionally comprising a step of said processor identifying said dairy animal via said automatic identification.

It is another object of the present invention to disclose the method as described above, additionally comprising a step of selecting said automatic identification from a group consisting of: providing an automatically-readable identifier in communication with said dairy animal, biometric identification, and any combination thereof.

It is another object of the present invention to disclose the method as described above, additionally comprising a step of providing said automatically-readable identifier in communication with an animal attachment mechanism selected from a group consisting of: an ear tag, a body tag, a head collar, a neck collar, a harness, a bracelet attachable to a leg, an embedment in said animal and any combination thereof.

It is another object of the present invention to disclose the method as described above, additionally comprising a step of providing said animal attachment mechanism comprising said at least one sensor.

It is another object of the present invention to disclose the method as described above, additionally comprising a step of selecting said biometric identification from a group consisting of: identifying at least one marking on said animal, identifying a muzzle print image of said animal, identifying an iris pattern of said animal, identifying a retinal vascular pattern of said animal, facial recognition of said animal, recognition of an external physical feature of said animal, identifying an ear vascular pattern of said animal, and any combination thereof.

It is another object of the present invention to disclose the method as described above, additionally comprising a step of said determining of said average milk production being averaging of milk production per milking over a production measurement period.

It is another object of the present invention to disclose the method as described above, additionally comprising a step of selecting said production measurement period to be in a range of one day to 2 weeks.

It is another object of the present invention to disclose the method as described above, additionally comprising a step of selecting said production measurement period to be 7 days.

It is another object of the present invention to disclose the method as described above, additionally comprising a step of selecting said predetermined drying-off start time to be said expected parturition date minus the sum of a predetermined amount of time before expected parturition and said predetermined drying-off period.

It is another object of the present invention to disclose the method as described above, additionally comprising a step of selecting said predetermined amount of time before expected parturition to be in a range of 30-90 days before the expected calving for a cow, 20-100 days before lambing for a sheep, 25-70 days before kidding for a goat, and 45-100 days before calving for a buffalo.

It is another object of the present invention to disclose the method as described above, additionally comprising a step of selecting said predetermined drying-off period to be in a range of 7 days to 3 weeks.

It is another object of the present invention to disclose the method as described above, additionally comprising a step of selecting said predetermined amount of milk to be 10 kg/day.

It is another object of the present invention to disclose the method as described above, additionally comprising a step of selecting said amount of milk to be removed to be in a range of 50% to 80% of said average milk production.

It is another object of the present invention to disclose the method as described above, additionally comprising a step of selecting said amount of milk to be removed to be 70% of said average milk production.

It is another object of the present invention to disclose the method as described above, additionally comprising a step of determining said amount of milk to be removed either as an amount to be removed from said udder or as an amount to be removed from each milkable quarter.

It is another object of the present invention to disclose the method as described above, additionally comprising a step of selecting said dairy animal from a group consisting of: a cow, a sheep, a goat, a buffalo, and a camel.

It is another object of the present invention to disclose a method for automatically drying-off a dairy animal, comprising steps of:
  for a duration of gestation greater than a drying-off start time, determining average milk production for said dairy animal;
  for said average milk production being greater than a predetermined amount of milk:
    determining, from at least one other consideration, whether gradual drying-off is indicated;
    for at least one other consideration indicating gradual drying-off:
      selecting a current milking to be a start date for gradual drying-off; and
      determining, from said start date and a predetermined drying-off period, a dry-off date;
  wherein said gradual drying-off comprises:
    for each current milking of said dairy animal on or after said start date;
    determining an amount of milk to be removed;
    machine milking said dairy animal;
    measuring removal of milk in real time during milking; and
    at such time as said milk production is greater than said amount of milk to be removed, stopping said current milking.

It is another object of the present invention to disclose the method as described above, additionally comprising a step of: for said average milk production being less than or equal to said predetermined amount of milk, using abrupt dry-off by discontinuing milking.

It is another object of the present invention to disclose the method as described above, additionally comprising steps of: determining, from a current date and said dry-off date, a number of days until said dry-off date; and determining said amount of milk to be removed from said number of days until said dry-off date and said average milk production.

It is another object of the present invention to disclose the method as described above, wherein said amount of milk to be removed is independent of flow rate of milk from said dairy animal.

It is another object of the present invention to disclose the method as described above, wherein said average milk production is average daily milk production.

It is another object of the present invention to disclose the method as described above, additionally comprising a step of calculating said average milk production from milk production over a time period in a range between two weeks and a time interval from one milking to a next milking, said time interval including a single milking.

It is another object of the present invention to disclose the method as described above, additionally comprising a step of providing a system for milking said dairy animal, said dairy animal uniquely identifiable; said system comprising:
  a milking controller configured to control said removal of milk from said dairy animal's udder;
  at least one milk meter in communication with said milking controller, said at least one milk meter configured to measure an amount of said removal of milk; and
  at least one milking processor, said milking processor configured to determine said amount of milk to be removed by said milking controller; said milking processor further configured to store, for said dairy animal, at least one previous amount of milk removed and to generate, for said dairy animal, said average milk production from said at least one previous amount of milk removed.

It is another object of the present invention to disclose the method as described above, additionally comprising a step of controlling initiation of said removal of milk.

It is another object of the present invention to disclose the method as described above, additionally comprising a step of selecting said control of initiation of said removal of milk to be either manual control of initiation of said removal of milk or automatic control of initiation of said removal of milk.

It is another object of the present invention to disclose the method as described above, additionally comprising a step of selecting said at least one other consideration from a group consisting of: a dairy animal's health, feed a dairy animal is being given, a need to transition to another feed, pasture a dairy animal is on, a desire to change pasture, a need for milk, a dairy animal's lactation number and any combination thereof.

It is another object of the present invention to disclose the method as described above, additionally comprising steps of, for said at least one other consideration not indicating gradual drying-off, milking-out at each milking until either said average milk production is less than or equal to said predetermined amount of milk; and for said at least one other consideration indicating gradual drying-off, selecting abrupt dry-off for average milk production being less than or equal to said predetermined amount of milk and selecting gradual drying-off for average milk production being greater than said predetermined amount of milk.

It is another object of the present invention to disclose the method as described above, additionally comprising a step of identifying said dairy animal.

It is another object of the present invention to disclose the method as described above, additionally comprising a step of selecting said identifying of said dairy animal from a group consisting of: manual identification, automatic identification and any combination thereof.

It is another object of the present invention to disclose the method as described above, additionally comprising a step of said processor identifying said dairy animal via said automatic identification.

It is another object of the present invention to disclose the method as described above, additionally comprising a step of selecting said automatic identification from a group consisting of: providing an automatically-readable identifier in communication with said dairy animal, biometric identification, and any combination thereof.

It is another object of the present invention to disclose the method as described above, additionally comprising a step of providing said automatically-readable identifier in communication with an animal attachment mechanism selected from a group consisting of: an ear tag, a body tag, a head collar, a neck collar, a harness, a bracelet attachable to a leg, an embedment in said animal and any combination thereof.

It is another object of the present invention to disclose the method as described above, additionally comprising a step of providing said animal attachment mechanism comprising said at least one sensor.

It is another object of the present invention to disclose the method as described above, additionally comprising a step of selecting said biometric identification from a group consisting of: identifying at least one marking on said animal, identifying a muzzle print image of said animal, identifying an iris pattern of said animal, identifying a retinal vascular pattern of said animal, facial recognition of said animal, recognition of an external physical feature of said animal, identifying an ear vascular pattern of said animal, and any combination thereof.

It is another object of the present invention to disclose the method as described above, additionally comprising a step of said determining of said average milk production being averaging of milk production per milking over a production measurement period.

It is another object of the present invention to disclose the method as described above, additionally comprising a step of selecting said production measurement period to be in a range of one day to 2 weeks.

It is another object of the present invention to disclose the method as described above, additionally comprising a step of selecting said production measurement period to be 7 days.

It is another object of the present invention to disclose the method as described above, additionally comprising a step of selecting said predetermined drying-off start time to be said expected parturition date minus the sum of a predetermined amount of time before expected parturition and said predetermined drying-off period.

It is another object of the present invention to disclose the method as described above, additionally comprising a step of selecting said predetermined amount of time before expected parturition to be in a range of 30-90 days before calving for a cow, 20-100 days before lambing for a sheep, 25-70 days before kidding for a goat, and 45-100 days before calving for a buffalo.

It is another object of the present invention to disclose the method as described above, additionally comprising a step of selecting said predetermined drying-off period to be in a range of 7 days to 3 weeks.

It is another object of the present invention to disclose the method as described above, additionally comprising a step of selecting said predetermined amount of milk to be 10 kg/day.

It is another object of the present invention to disclose the method as described above, additionally comprising a step of selecting said amount of milk to be removed to be in a range of 50% to 80% of said average milk production.

It is another object of the present invention to disclose the method as described above, additionally comprising a step of selecting said amount of milk to be removed to be 70% of said average milk production.

It is another object of the present invention to disclose the method as described above, additionally comprising a step of determining said amount of milk to be removed either as an amount to be removed from said udder or as an amount to be removed from each milkable quarter.

It is another object of the present invention to disclose the method as described above, additionally comprising a step of selecting said dairy animal from a group consisting of: a cow, a sheep, a goat, a buffalo, and a camel.

It is another object of the present invention to disclose a method for automatically drying-off a dairy animal, comprising steps of:
  for a duration of gestation greater than a predetermined drying-off start time, determining average milking duration for said dairy animal;
  for said average milking duration being greater than a predetermined milking duration:
    setting a start date for gradual drying-off as a current milking; and,
    determining, from said start date and a predetermined drying-off period, a dry-off date;

wherein said gradual drying-off comprises:
for each current milking of said dairy animal on or after said start date:
determining a milking duration;
machine milking said dairy animal;
measuring a time spent milking in real time during milking; and,
at such time as said time spent milking is greater than said milking duration, stopping said current milking.

It is another object of the present invention to disclose the method as described above, additionally comprising a step of: for said average milking duration being less than or equal to said predetermined milking time, using abrupt dry-off by discontinuing milking.

It is another object of the present invention to disclose the method as described above, additionally comprising steps of: determining said milking duration from a current date and said dry-off date, a number of days until said dry-off date; and determining said milking duration from said number of days until said dry-off date and said average milking duration.

It is another object of the present invention to disclose the method as described above, wherein said milking duration is independent of flow rate of milk from said dairy animal.

It is another object of the present invention to disclose the method as described above, wherein said average milking duration is average daily milking duration.

It is another object of the present invention to disclose the method as described above, additionally comprising a step of calculating said average milking duration from milking duration over a time period in a range between two weeks and a time interval from one milking to a next milking, said time interval including a single milking.

It is another object of the present invention to disclose the method as described above, additionally comprising a step of providing a system for milking said dairy animal, said dairy animal uniquely identifiable; said system comprising:
a milking controller configured to control said removal of milk from said dairy animal's udder;
at least one milk meter in communication with said milking controller, said at least one milk meter configured to measure an amount of said removal of milk; and
at least one milking processor, said milking processor configured to determine said amount of milk to be removed by said milking controller; said milking processor further configured to store, for said dairy animal, at least one previous amount of milk removed and to generate, for said dairy animal, said average milk production from said at least one previous amount of milk removed.

It is another object of the present invention to disclose the method as described above, additionally comprising a step of controlling initiation of said removal of milk.

It is another object of the present invention to disclose the method as described above, additionally comprising a step of selecting said control of initiation of said removal of milk from a group consisting of: manual control of initiation of said removal of milk, semi-automatic control of initiation of said removal of milk and automatic control of initiation of said removal of milk.

It is another object of the present invention to disclose the method as described above, additionally comprising a step of determining, from at least one other consideration, whether gradual drying-off is indicated.

It is another object of the present invention to disclose the method as described above, additionally comprising a step of selecting said at least one other consideration from a group consisting of: a dairy animal's health, feed a dairy animal is being given, a need to transition to another feed, pasture a dairy animal is on, a desire to change pasture, a need for milk, a dairy animal's lactation number and any combination thereof.

v additionally comprising steps of, for said at least one other consideration not indicating gradual drying-off, milking-out at each milking until either said average milking duration is less than or equal to said predetermined amount of milk; and for said at least one other consideration indicating gradual drying-off, selecting abrupt dry-off for average milking duration being less than or equal to said predetermined milking time and selecting gradual drying-off for average milking duration being greater than said predetermined milking time.

It is another object of the present invention to disclose the method as described above, additionally comprising a step of identifying said dairy animal.

It is another object of the present invention to disclose the method as described above, additionally comprising a step of selecting said identifying of said dairy animal from a group consisting of: manual identification, automatic identification and any combination thereof.

It is another object of the present invention to disclose the method as described above, additionally comprising a step of said processor identifying said dairy animal via said automatic identification.

It is another object of the present invention to disclose the method as described above, additionally comprising a step of selecting said automatic identification from a group consisting of: providing an automatically-readable identifier in communication with said dairy animal, biometric identification, and any combination thereof.

It is another object of the present invention to disclose the method as described above, additionally comprising a step of providing said automatically-readable identifier in communication with an animal attachment mechanism selected from a group consisting of: an ear tag, a body tag, a head collar, a neck collar, a harness, a bracelet attachable to a leg, an embedment in said animal and any combination thereof.

It is another object of the present invention to disclose the method as described above, additionally comprising a step of providing said animal attachment mechanism comprising said at least one sensor.

It is another object of the present invention to disclose the method as described above, additionally comprising a step of selecting said biometric identification from a group consisting of: identifying at least one marking on said animal, identifying a muzzle print image of said animal, identifying an iris pattern of said animal, identifying a retinal vascular pattern of said animal, facial recognition of said animal, recognition of an external physical feature of said animal, identifying an ear vascular pattern of said animal, and any combination thereof.

It is another object of the present invention to disclose the method as described above, additionally comprising a step of said determining of said average milking duration being averaging of milking duration per milking over a duration measurement period.

It is another object of the present invention to disclose the method as described above, additionally comprising a step of selecting said duration measurement period to be in a range of one day to 2 weeks.

It is another object of the present invention to disclose the method as described above, additionally comprising a step of selecting said duration measurement period to be 7 days.

It is another object of the present invention to disclose the method as described above, additionally comprising a step of selecting said predetermined drying-off start time to be said expected parturition date minus the sum of a predetermined amount of time before expected parturition and said predetermined drying-off period.

It is another object of the present invention to disclose the method as described above, additionally comprising a step of selecting said predetermined amount of time before expected parturition to be in a range of 30-90 days before calving for a cow, 20-100 days before lambing for a sheep, 25-70 days before kidding for a goat, and 45-100 days before calving for a buffalo.

It is another object of the present invention to disclose the method as described above, additionally comprising a step of selecting said predetermined drying-off period to be in a range of 7 days to 3 weeks.

It is another object of the present invention to disclose the method as described above, additionally comprising a step of selecting said predetermined amount of milk to be 10 kg/day.

It is another object of the present invention to disclose the method as described above, additionally comprising a step of selecting said milking duration to be in a range of 50% to 80% of said average milking duration.

It is another object of the present invention to disclose the method as described above, additionally comprising a step of selecting said milking duration to be 70% of said average milking duration.

It is another object of the present invention to disclose the method as described above, additionally comprising a step of determining said milking duration either as a milking duration for said udder or as a milking duration for each milkable quarter.

It is another object of the present invention to disclose the method as described above, additionally comprising a step of selecting said dairy animal from a group consisting of: a cow, a sheep, a goat, a buffalo, and a camel.

It is another object of the present invention to disclose a drying-off system for automatically drying-off a dairy animal, said drying-off system comprising a processor comprising instructions configured to:
  for a duration of gestation greater than a predetermined drying-off start time, determine average milk production for said dairy animal;
  for said average milk production being greater than a predetermined amount of milk:
    set a start date for gradual drying-off as a current milking; and,
    determine, from said start date and a predetermined drying-off period, a dry-off date;
  wherein instructions for gradual drying-off are configured to:
    for each current milking of said dairy animal on or after said start date:
      determine an amount of milk to be removed;
      machine milk said dairy animal;
      measure removal of milk in real time during milking; and
      at such time as said milk production is greater than said amount of milk to be removed, stop said current milking.

It is another object of the present invention to disclose the drying-off system as described above, additionally comprising instructions configured to, for said average milk production being less than or equal to said predetermined amount of milk, institute abrupt dry-off by discontinuing milking.

It is another object of the present invention to disclose the drying-off system as described above, additionally comprising instructions configured to determine, from a current date and said dry-off date, a number of days until said dry-off date; and to determine said amount of milk to be removed from said number of days until said dry-off date and said average milk production.

It is another object of the present invention to disclose the drying-off system as described above, wherein said amount of milk to be removed is independent of flow rate of milk from said dairy animal.

It is another object of the present invention to disclose the drying-off system as described above, wherein said average milk production is average daily milk production.

It is another object of the present invention to disclose the drying-off system as described above, wherein said average milk production is calculable from milk production over a time period in a range between two weeks and a time interval from one milking to a next milking, said time interval including a single milking.

It is another object of the present invention to disclose the drying-off system as described above, additionally comprising a milking system for milking said dairy animal, said dairy animal uniquely identifiable; said milking system comprising:
  a milking controller configured to control said removal of milk from said dairy animal's udder;
  at least one milk meter in communication with said milking controller, said at least one milk meter configured to measure an amount of said removal of milk; and
  at least one milking processor, said milking processor configured to determine said amount of milk to be removed by said milking controller; said milking processor further configured to store, for said dairy animal, at least one previous amount of milk removed and to generate, for said dairy animal, said average milk production from said at least one previous amount of milk removed.

It is another object of the present invention to disclose the drying-off system as described above, wherein said milking controller is additionally configured to control initiation of said removal of milk.

It is another object of the present invention to disclose the drying-off system as described above, wherein said control of initiation of said removal of milk is selected from a group consisting of: manual control of initiation of said removal of milk, semi-automatic control of initiation of said removal of milk and automatic control of initiation of said removal of milk.

It is another object of the present invention to disclose the drying-off system as described above, wherein said processor additionally comprises instructions configured to determine, from at least one other consideration, whether gradual drying-off is indicated.

It is another object of the present invention to disclose the drying-off system as described above, wherein said at least one other consideration is selected from a group consisting of: a dairy animal's health, feed a dairy animal is being given, a need to transition to another feed, pasture a dairy animal is on, a desire to change pasture, a need for milk, a dairy animal's lactation number and any combination thereof.

It is another object of the present invention to disclose the drying-off system as described above, wherein, for said at least one other consideration not indicating gradual drying-off, said processor additionally comprises instructions configured to milk-out at each milking until either said average milk production is less than or equal to said predetermined amount of milk; and for said at least one other consideration indicating gradual drying-off, abrupt dry-off being selected for average milk production being less than or equal to said predetermined amount of milk and gradual drying-off being selected for average milk production being greater than said predetermined amount of milk.

It is another object of the present invention to disclose the drying-off system as described above, wherein said dairy animal is identifiable.

It is another object of the present invention to disclose the drying-off system as described above, wherein identifying of said dairy animal is selected from a group consisting of: manual identification, automatic identification and any combination thereof.

It is another object of the present invention to disclose the drying-off system as described above, wherein said processor additionally comprises instructions configured to identify said dairy animal via said automatic identification.

It is another object of the present invention to disclose the drying-off system as described above, wherein said automatic identification is selected from a group consisting of: an automatically-readable identifier in communication with said dairy animal, biometric identification, and any combination thereof.

It is another object of the present invention to disclose the drying-off system as described above, wherein said automatically-readable identifier is in communication with an animal attachment mechanism selected from a group consisting of: an ear tag, a body tag, a head collar, a neck collar, a harness, a bracelet attachable to a leg, an embedment in said animal and any combination thereof.

It is another object of the present invention to disclose the drying-off system as described above, wherein said an animal attachment mechanism comprises said at least one sensor.

It is another object of the present invention to disclose the drying-off system as described above, wherein said biometric identification is selected from a group consisting of: identifying at least one marking on said animal, identifying a muzzle print image of said animal, identifying an iris pattern of said animal, identifying a retinal vascular pattern of said animal, facial recognition of said animal, recognition of an external physical feature of said animal, identifying an ear vascular pattern of said animal, and any combination thereof.

It is another object of the present invention to disclose the drying-off system as described above, wherein said average milk production is determinable from an average of milk production per milking over a production measurement period.

It is another object of the present invention to disclose the drying-off system as described above, wherein, said production measurement period is in a range of one day to 2 weeks.

It is another object of the present invention to disclose the drying-off system as described above, wherein said production measurement period is 7 days.

It is another object of the present invention to disclose the drying-off system as described above, wherein said predetermined drying-off start time is said expected parturition date minus the sum of a predetermined amount of time before expected parturition and said predetermined drying-off period.

It is another object of the present invention to disclose the drying-off system as described above, wherein said predetermined amount of time before expected parturition is in a range of 30-90 days before calving for a cow, 20-100 days before lambing for a sheep, 25-70 days before kidding for a goat, and 45-100 days before calving for a buffalo.

It is another object of the present invention to disclose the drying-off system as described above, wherein said predetermined drying-off period is in a range of 7 days to 3 weeks.

It is another object of the present invention to disclose the drying-off system as described above, wherein said predetermined amount of milk is 10 kg/day.

It is another object of the present invention to disclose the drying-off system as described above, wherein said amount of milk to be removed is in a range of 50% to 80% of said average milk production.

It is another object of the present invention to disclose the drying-off system as described above, wherein said amount of milk to be removed is 70% of said average milk production.

It is another object of the present invention to disclose the drying-off system as described above, wherein said amount of milk to be removed is determined individually as an amount of milk production for each of said at least one quarter.

It is another object of the present invention to disclose the drying-off system as described above, wherein said dairy animal is selected from a group consisting of: a cow, a sheep, a goat, a buffalo, and a camel.

It is another object of the present invention to disclose a drying-off system for automatically drying-off a dairy animal, said drying-off system comprising a processor comprising instructions configured to:
  for a duration of gestation greater than a predetermined drying-off start time, determine average milk production for said dairy animal;
  for said average milk production being greater than a predetermined amount of milk:
    determine, from at least one other consideration, whether gradual drying-off is indicated;
    for said at least one other consideration indicating gradual drying-off:
    select a current milking to be a start date for gradual drying-off; and
    determine, from said start date and a predetermined drying-off period, a dry-off date for said gradual drying-off;
  wherein instructions for said gradual drying-off comprise:
    for each current milking of said dairy animal on or after said start date;
      determine an amount of milk to be removed;
      initiate machine milking of said dairy animal;
      measure removal of milk in real time during milking; and
      at such time as said milk production is greater than said amount of milk to be removed, stop said current milking.

It is another object of the present invention to disclose the drying-off system as described above, additionally comprising instructions configured to, for said average milk production being less than or equal to said predetermined amount of milk, institute abrupt dry-off by discontinuing milking.

It is another object of the present invention to disclose the drying-off system as described above, additionally comprising instructions configured to determine, from a current date and said dry-off date, a number of days until said dry-off date; and determine said amount of milk to be removed from said number of days until said dry-off date and said average milk production.

It is another object of the present invention to disclose the drying-off system as described above, wherein said amount of milk to be removed is independent of flow rate of milk from said dairy animal.

It is another object of the present invention to disclose the drying-off system as described above, wherein said average milk production is average daily milk production.

It is another object of the present invention to disclose the drying-off system as described above, wherein said average milk production is calculable from milk production over a time period in a range between two weeks and a time interval from one milking to a next milking, said time interval including a single milking.

It is another object of the present invention to disclose the drying-off system as described above, additionally comprising a milking system for milking said dairy animal, said dairy animal uniquely identifiable; said milking system comprising:
 a milking controller configured to control said removal of milk from said dairy animal's udder;
 at least one milk meter in communication with said milking controller, said at least one milk meter configured to measure an amount of said removal of milk; and
 at least one milking processor, said milking processor configured to determine said amount of milk to be removed by said milking controller; said milking processor further configured to store, for said dairy animal, at least one previous amount of milk removed and to generate, for said dairy animal, said average milk production from said at least one previous amount of milk removed.

It is another object of the present invention to disclose the drying-off system as described above, wherein said milking controller is additionally configured to control initiation of said removal of milk.

It is another object of the present invention to disclose the drying-off system as described above, wherein said control of initiation of said removal of milk is selected from a group consisting of: manual control of initiation of said removal of milk, semi-automatic control of initiation of said removal of milk and automatic control of initiation of said removal of milk.

It is another object of the present invention to disclose the drying-off system as described above, wherein said at least one other consideration is selected from a group consisting of: a dairy animal's health, feed a dairy animal is being given, a need to transition to another feed, pasture a dairy animal is on, a desire to change pasture, a need for milk, a dairy animal's lactation number and any combination thereof.

It is another object of the present invention to disclose the drying-off system as described above, wherein, for said at least one other consideration not indicating gradual drying-off, said processor additionally comprises instructions configured to milk-out at each milking until either said average milk production is less than or equal to said predetermined amount of milk; and for said at least one other consideration indicating gradual drying-off, abrupt dry-off being selected for average milk production being less than or equal to said predetermined amount of milk and gradual drying-off being selected for average milk production being greater than said predetermined amount of milk.

It is another object of the present invention to disclose the drying-off system as described above, wherein said dairy animal is identifiable.

It is another object of the present invention to disclose the drying-off system as described above, wherein said identification of said dairy animal is selected from a group consisting of: manual identification, automatic identification and any combination thereof.

It is another object of the present invention to disclose the drying-off system as described above, wherein said processor additionally comprises instructions configured to identify said dairy animal via said automatic identification.

It is another object of the present invention to disclose the drying-off system as described above, wherein said automatic identification is selected from a group consisting of: an automatically-readable identifier in communication with said dairy animal, biometric identification, and any combination thereof.

It is another object of the present invention to disclose the drying-off system as described above, wherein said automatically-readable identifier is in communication with an animal attachment mechanism selected from a group consisting of: an ear tag, a body tag, a head collar, a neck collar, a harness, a bracelet attachable to a leg, an embedment in said animal and any combination thereof.

It is another object of the present invention to disclose the drying-off system as described above, wherein said an animal attachment mechanism comprises said at least one sensor.

It is another object of the present invention to disclose the drying-off system as described above, wherein said biometric identification is selected from a group consisting of: identifying at least one marking on said animal, identifying a muzzle print image of said animal, identifying an iris pattern of said animal, identifying a retinal vascular pattern of said animal, facial recognition of said animal, recognition of an external physical feature of said animal, identifying an ear vascular pattern of said animal, and any combination thereof.

It is another object of the present invention to disclose the drying-off system as described above, wherein said average milk production is determinable from an average of milk production per milking over a production measurement period.

It is another object of the present invention to disclose the drying-off system as described above, wherein, said production measurement period is in a range of one day to 2 weeks.

It is another object of the present invention to disclose the drying-off system as described above, wherein said production measurement period is 7 days.

It is another object of the present invention to disclose the drying-off system as described above, wherein said predetermined drying-off start time is said expected parturition date minus the sum of a predetermined amount of time before expected parturition and said predetermined drying-off period.

It is another object of the present invention to disclose the drying-off system as described above, wherein said predetermined amount of time before expected parturition is in a range of 30-90 days before calving for a cow, 20-100 days before lambing for a sheep, 25-70 days before kidding for a goat, and 45-100 days before calving for a buffalo.

It is another object of the present invention to disclose the drying-off system as described above, wherein said predetermined drying-off period is in a range of 7 days to 3 weeks.

It is another object of the present invention to disclose the drying-off system as described above, wherein said predetermined amount of milk is 10 kg/day.

It is another object of the present invention to disclose the drying-off system as described above, wherein said amount of milk to be removed is in a range of 50% to 80% of said average milk production.

It is another object of the present invention to disclose the drying-off system as described above, wherein said amount of milk to be removed is 70% of said average milk production.

It is another object of the present invention to disclose the drying-off system as described above, wherein said amount of milk to be removed is determined individually as an amount of milk production for each of said at least one quarter.

It is another object of the present invention to disclose the drying-off system as described above, wherein said dairy animal is selected from a group consisting of: a cow, a sheep, a goat, a buffalo, and a camel.

It is another object of the present invention to disclose a drying-off system for automatically drying-off a dairy animal, said drying-off system comprising a processor comprising instructions configured to:
  for a duration of gestation greater than a predetermined drying-off start time, determine average milking duration for said dairy animal;
  for said average milking duration being greater than a predetermined milking duration:
    set a start date for gradual drying-off as a current milking; and,
    determine, from said start date and a predetermined drying-off period, a dry-off date;
  wherein instructions for gradual drying-off are configured to:
    for each current milking of said dairy animal on or after said start date:
      determine a milking duration;
      machine milk said dairy animal;
      measure a time spent milking in real time during milking; and
      at such time as said time spent milking is greater than said milking duration, stop said current milking.

It is another object of the present invention to disclose the drying-off system as described above, additionally comprising instructions configured to, for said average milking duration being less than or equal to said predetermined milking time, institute abrupt dry-off by discontinuing milking.

It is another object of the present invention to disclose the drying-off system as described above, additionally comprising instructions configured to determine, from a current date and said dry-off date, a number of days until said dry-off date; and to determine said milking duration from said number of days until said dry-off date and said average milking duration.

It is another object of the present invention to disclose the drying-off system as described above, wherein milking duration is independent of flow rate of milk from said dairy animal.

It is another object of the present invention to disclose the drying-off system as described above, wherein said average milking duration is average daily milking duration.

It is another object of the present invention to disclose the drying-off system as described above, wherein said average milking duration is calculable from milking duration over a time period in a range between two weeks and a time interval from one milking to a next milking, said time interval including a single milking.

It is another object of the present invention to disclose the drying-off system as described above, additionally comprising a milking system for milking said dairy animal, said dairy animal uniquely identifiable; said milking system comprising:
  a milking controller configured to control said removal of milk from said dairy animal's udder;
  at least one timer, said at least one timer configured to measure time spent milking; and
  at least one milking processor, said milking processor configured to determine said amount of milk to be removed by said milking controller; said milking processor further configured to store, for said dairy animal, at least one previous milking duration and to generate, for said dairy animal, said average milking duration from said at least one previous milking duration.

It is another object of the present invention to disclose the drying-off system as described above, wherein said milking controller is additionally configured to control initiation of said removal of milk.

It is another object of the present invention to disclose the drying-off system as described above, wherein said control of initiation of said removal of milk is selected from a group consisting of: manual control of initiation of said removal of milk, semi-automatic control of initiation of said removal of milk and automatic control of initiation of said removal of milk.

It is another object of the present invention to disclose the drying-off system as described above, wherein said processor additionally comprises instructions configured to determine, from at least one other consideration, whether gradual drying-off is indicated.

It is another object of the present invention to disclose the drying-off system as described above, wherein said at least one other consideration is selected from a group consisting of: a dairy animal's health, feed a dairy animal is being given, a need to transition to another feed, pasture a dairy animal is on, a desire to change pasture, a need for milk, a dairy animal's lactation number and any combination thereof.

It is another object of the present invention to disclose the drying-off system as described above, wherein, for said at least one other consideration not indicating gradual drying-off, said processor additionally comprises instructions configured to milk-out at each milking until either said average milking duration is less than or equal to said predetermined milking time; and for said at least one other consideration indicating gradual drying-off, abrupt dry-off being selected for average milking duration being less than or equal to said predetermined milking time and gradual drying-off being selected for average milking duration being greater than said predetermined milking time.

It is another object of the present invention to disclose the drying-off system as described above, wherein said dairy animal is identifiable.

It is another object of the present invention to disclose the drying-off system as described above, wherein identifying of said dairy animal is selected from a group consisting of: manual identification, automatic identification and any combination thereof.

It is another object of the present invention to disclose the drying-off system as described above, wherein said processor additionally comprises instructions configured to identify said dairy animal via said automatic identification.

It is another object of the present invention to disclose the drying-off system as described above, wherein said automatic identification is selected from a group consisting of: an automatically-readable identifier in communication with said dairy animal, biometric identification, and any combination thereof.

It is another object of the present invention to disclose the drying-off system as described above, wherein said automatically-readable identifier is in communication with an animal attachment mechanism selected from a group consisting of: an ear tag, a body tag, a head collar, a neck collar, a harness, a bracelet attachable to a leg, an embedment in said animal and any combination thereof.

It is another object of the present invention to disclose the drying-off system as described above, wherein said an animal attachment mechanism comprises said at least one sensor.

It is another object of the present invention to disclose the drying-off system as described above, wherein said biometric identification is selected from a group consisting of: identifying at least one marking on said animal, identifying a muzzle print image of said animal, identifying an iris pattern of said animal, identifying a retinal vascular pattern of said animal, facial recognition of said animal, recognition of an external physical feature of said animal, identifying an ear vascular pattern of said animal, and any combination thereof.

It is another object of the present invention to disclose the drying-off system as described above, wherein said average milking duration is determinable from an average of milking duration per milking over a duration measurement period.

It is another object of the present invention to disclose the drying-off system as described above, wherein, said duration measurement period is in a range of one day to 2 weeks.

It is another object of the present invention to disclose the drying-off system as described above, wherein said duration measurement period is 7 days.

It is another object of the present invention to disclose the drying-off system as described above, wherein said predetermined drying-off start time is said expected parturition date minus the sum of a predetermined amount of time before expected parturition and said predetermined drying-off period.

It is another object of the present invention to disclose the drying-off system as described above, wherein said predetermined amount of time before expected parturition is in a range of 30-90 days before calving for a cow, 20-100 days before lambing for a sheep, 25-70 days before kidding for a goat, and 45-100 days before calving for a buffalo.

It is another object of the present invention to disclose the drying-off system as described above, wherein said predetermined drying-off period is in a range of 7 days to 3 weeks.

It is another object of the present invention to disclose the drying-off system as described above, wherein said predetermined amount of milk is 10 kg/day.

It is another object of the present invention to disclose the drying-off system as described above, wherein said milking duration is in a range of 50% to 80% of said average milking duration.

It is another object of the present invention to disclose the drying-off system as described above, wherein said milking duration is 70% of said average milking duration.

It is another object of the present invention to disclose the drying-off system as described above, wherein said milking duration is determined individually as a milking duration for each of said at least one quarter.

It is another object of the present invention to disclose the drying-off system as described above, wherein said dairy animal is selected from a group consisting of: a cow, a sheep, a goat, a buffalo, and a camel.

BRIEF DESCRIPTION OF THE FIGURES

In order to better understand the invention and its implementation in practice, a plurality of embodiments will now be described, by way of non-limiting example only, with reference to the accompanying drawings, wherein FIG. 1 schematically illustrates amount of milk typically produced by a dairy cow during a lactation.

DETAILED DESCRIPTION OF THE PREFERRED EMBODIMENTS

The following description is provided, alongside all chapters of the present invention, so as to enable any person skilled in the art to make use of said invention and sets forth the best modes contemplated by the inventor of carrying out this invention. Various modifications, however, will remain apparent to those skilled in the art, since the generic principles of the present invention have been defined specifically to provide an automated means and method for drying-off dairy animals.

The term 'dairy animal' hereinafter refers to an animal such as a cow, a sheep, a goat, a pig, a buffalo, and a camel.

The term 'quarter' hereinafter refers to the portion of the udder of a dairy animal connected to a single teat. The milk produced by a given quarter is normally removed from the dairy animal via the single, connected teat. For non-limiting example, cows typically have four quarters (and four teats), while goats and sheep have two quarters and two teats.

Dairy animals require a dry period between lactations to maintain optimum milk production during lactation.

The goals of an ideal dry-off period include keeping the dairy animals healthy, minimizing the dairy animals' discomfort during dry-off, preferably entirely avoiding pain, maintaining the dairy animals' daily routine, and conserving money.

Maintaining the dairy animals' daily routine includes keeping the dairy animals resting and feeding as normally as possible, which minimizes stress in the dairy animals. Minimizing stress will reduce the probability of illness, including mastitis, and can also reduce the probability of fighting between animals, thereby reducing the possibility of injury.

Money can be conserved by minimizing the length of the dry-off period. The higher-protein diet fed to lactating animals is significantly more expensive than the lower-protein maintenance diet used for dry animals. Typically, for dairy cows, transition to a maintenance diet occurs when milk production is below about 5 liters per day. Therefore, the sooner after start of dry-off that that animal transitions to low production, the sooner the dairy animal can be placed on a maintenance diet, thereby reducing the cost of her feed.

However, it should be noted that, during dry-off and during the dry period, there is considerable fetal growth, so that, prepartum, there are high nutritional demands on the dairy animal. In dairy cows, the maximum length of this high nutritional demand period is about 3 weeks prepartum.

During the drying-off period, there is mammary tissue remodeling to prepare for the dry period and, near the end of the dry period, there is mammary tissue remodeling to prepare for next lactation.

The entire period from start of dry-off until the next calving can be very physiologically demanding for high-yielding dairy cows.

The goal of dry dairy animal management from an udder health perspective is for the dairy animal to start the new lactation with healthy, uninfected mammary glands.

Figure 1:
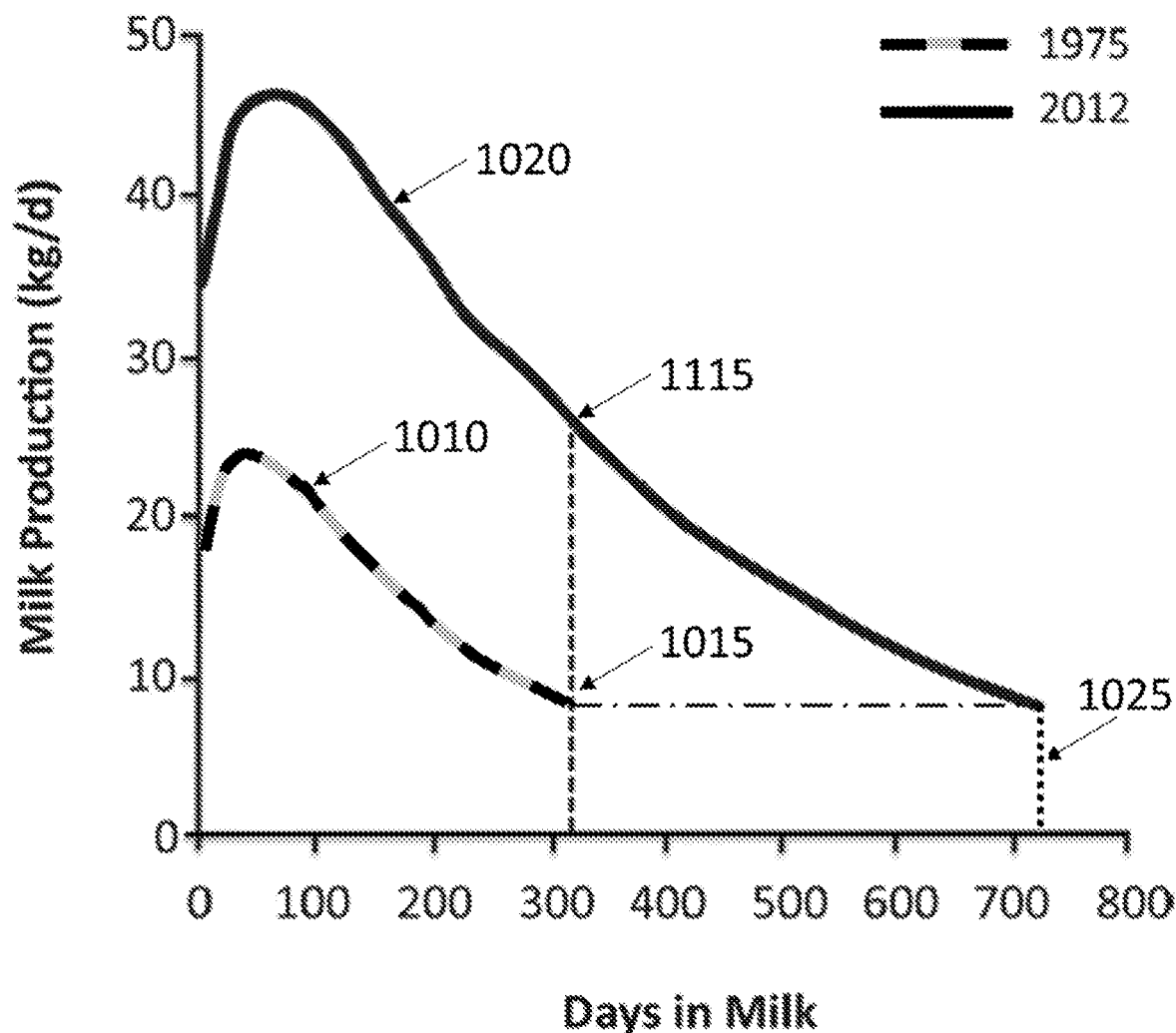

As shown in FIG. 1, during a lactation cycle, milk production increases to a peak and then spontaneously decreases, ceasing at dry-off. Peak milk production in dairy cows typically occurs after approximately 60-70 days in milk After peak milk production, a spontaneous decrease in milk production begins. Gradual mammary gland involution occurs early in lactation and results in the slow decline of milk production observed in the natural lactation cycle.

Naturally-occurring mammary gland involution (dry-off) is accompanied by metabolic and immunological adaptations to prevent intramammary infection during this time.

A complete transition from a lactating to a non-lactating state is not done on the day of start of dry-off—in a modern dairy cow, a complete transition can take as long as 3-4 weeks after an abrupt cessation of lactation.

FIG. 1 further shows how daily milk production in dairy cows has changed over the past four decades. In 1975, a typical high-producing dairy cow would produce (1010) about 25 kg of milk per day at peak production, decreasing to about 10 kg/day at dry-off (1015), with dry-off typically occurring approximately 320 days after the start of milk production.

In contrast, in 2012, a typical high-producing dairy cow would produce (1020) about 45 kg of milk per day at peak production. Approximately 320 days after the start of milk production (1115), when dry-off typically occurred in 1975, the 2012 dairy cow was still producing 25 kg/day or more of milk, about the same amount as her 1975 counterpart produced at peak production. More than 25 kg of milk per day at approximately day 320 of milk production is not untypical of bovine somatotrophin (BST)-treated cows. Production of approximately 10 kg/day, when dry-off is typically instituted, will typically occur, in the 2012 cow, approximately 720 days (1025) after the start of milk production. This prolonged high production requires modern cows to undergo a forced dry off, also referred to as acute involution.

However, current management regimes for dairy animals were established decades ago and are therefore outdated for production levels typical of modern dairy animals. For example, for cows, current management regimes are intended for animals with milk production levels typical of the 1975 cow, not the modern cow with much elevated milk production levels.

Before widespread adoption of blanket antibiotic therapy and teat sealant therapy during dry-off, dry-off was achieved by reducing milking frequency and providing a lower energy diet. Blanket antibiotic therapy is used mainly for contagious pathogens and teat sealant therapy is used mainly for environmental pathogens, especially when keratin plug formation is ineffective or doesn't happen in time. Incorporation of these therapies led to a move towards a recommended protocol of abrupt dry-off. However, abrupt dry-off can be very stressful for high-producing dairy animals and, in addition, there is increasing demand to minimize antibiotic use, both from consumers and from medical professionals who want to minimize the risk of generating antibiotic-resistant pathogens.

It is well known that the high-risk periods for new intermammary infections (IMI) are the transition periods, (1) when a mammary gland moves from a lactating to a non-lactating state and (2) when a mammary gland moves from a non-lactating to a lactating state. IMIs acquired during the transition periods can persist into the lactating period. For example, over 50% of environmental mastitis cases that occur during the first 100 days in milk were acquired during the previous transition periods.

Within the transition periods, the highest susceptibility times are: immediately after cessation of milking, when the protective barriers have not yet been established, and during colostrogenesis (the 7 days before calving), when the protective barriers established during the dry period wane.

In contrast, during the completely dry period, where the mammary gland is fully involuted, new IMIs are unlikely to develop.

Dairy animals with high production at the beginning of the dry-off period are at considerably increased risk, compared to dairy animals with lower production, of acquiring new IMI during the high-risk periods. Reasons include:

The longer time until complete milk resorption and complete mammary gland involution.

Milk leakage and failure to establish a keratin plug in the teat canal, so that the teat canal remains open to invading bacteria.

A slower build-up of local immune defenses inside the mammary gland, so that it takes longer to reach adequate concentrations of and activity of leukocytes, lactoferrin and immunoglobulins, leading to delayed protective effects from the immune defenses.

Forced dry off causes a general inflammatory response in the udder, which resembles necrosis during wounding and weakens the natural defense mechanisms.

There are important connections between milk yield at dry-off and the dry-off method and both mammary health and milk yield during the next lactation cycle.

Some of the conditions associated with dry-off and their associated effects are listed in Table 1. These conditions are given for cows, but many, if not all, apply to other high-yielding dairy animals.

TABLE 1

| Condition | Resulting Risks and Effects |
| --- | --- |
| High yield at start of dry-off | The risk of a new IMI in the dry period doubles for every 12 liter increase in yield at start of dry off. |
| | If milk production on the day prior to the start of dry off was greater than 21 kg, the quarters are 1.8 times less likely to close. |
| | Increased yield at dry-off is a significant risk factor for infection with environmental pathogens at calving: For every 5-kg increase in milk |

TABLE 1-continued

| Condition | Resulting Risks and Effects |
|---|---|
| | yield at start of dry-off above 12.5 kg, the probability of the cow having mixed environmental intermammary infections at calving is increased by 77%. |
| Delayed teat canal closure | Cows dried off while producing more than 21 kg/d are 1.8 times more likely to experience delayed teat canal closure. In high-producing cows, 50% of teat canals are still open 10 days after the start of dry off.<br>97% of clinical mastitis that occurs during the dry period happens in quarters without a keratin plug. |
| Poor keratin plug or no keratin plug | Quarters that form a keratin plug early in the dry-off period have a lower probability of having a new IMI during the dry period than quarters that did not form a keratin plug early. |
| Milk leakage | Cows leaking milk following the start of dry-off, which occurs with a higher frequency in higher-yielding cows, were 4 times more likely to develop clinical mastitis during the dry period than cows that did not leak. |
| Abrupt dry-off | Even when accompanied by antibiotics and teat sealants, this puts the health of high-yielding cows at risk.<br>In one study, 75% of abruptly dried-off high-producing cows (average 24 kg/d at dry-off) still leak milk even when external and internal teat sealants are used.<br>Increasing yield at dry-off is a significant risk factor for infection with environmental pathogens at calving, even in cows receiving antibiotic dry treatment. |
| Increasing demand to eliminate widespread antibiotic use | A need to find ways to improve udder health around dry-off while reducing reliance on blanket antibiotic therapy during drying-off and for dry cows. |
| Dry-off period is extremely stressful to cows | There is a need to minimize additional stress wherever possible. Regardless of the dry-off method, additional stress is generated during drying-off and during the dry period by social factors such as changing a cow's social group from a lactating-cow group to a dry-cow group and by changing the cow's rations from a high-protein lactating diet to a lower-protein dry-cow diet. |

It should be noted that leakage is most probable, not at the start of dry-off, but 1-2 days later. This occurs because, in the bovine mammary gland, milk flows from primary ducts into cisterns. The cisterns have a high storage capacity, only reaching full capacity after about 40 hours. Therefore, leakage may be delayed for 1-2 days after the start of dry-off, when the cisterns get over-full and udder pressures peak.

The dry-off method of the present invention minimizes stress on the dairy animal by providing a more natural drying-off which enables the dairy animal to remain with her social group during drying-off and which, by decreasing the maximum pressure inside the udder during drying-off, minimizes the chance of leakage, increases the probability of formation of a natural teat plug and decreases the probability of intermammary infections.

In the dry-off method of the present invention, yield and milk flow are monitored so that:
 A decision can be made automatically whether the dairy animal needs a gradual cessation or whether abrupt dry-off can be used.
 Milk production can be monitored to ensure success of gradual cessation, by ensuring that the decrease in milk production follows a desired milk production drop curve.
 In embodiments where the dairy animals carry an advanced animal identification tag comprising at least one sensor in communication with at least one sensor processor, the at least one sensor and the at least one processor can be configured to determine a health index for the dairy animal, so that the dairy animal's health and wellbeing during the process can be monitored.

Figure 2:
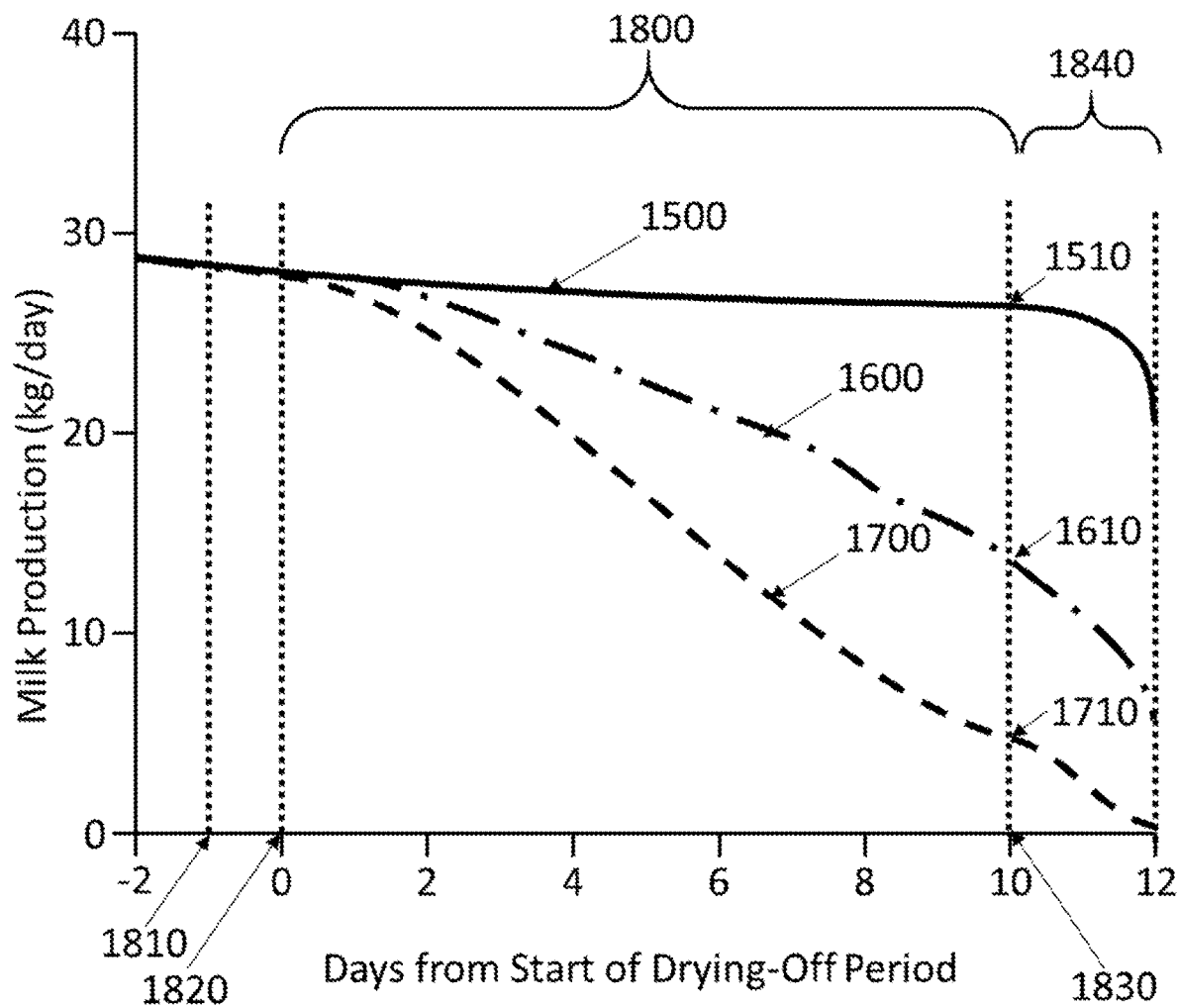
FIG. 2 schematically illustrates amount of milk produced per day during a drying-off period according to two different dry-off regimens.

FIG. 2 schematically illustrates a comparison of abrupt dry-off (1500, solid line) with the method of increasing the interval between milkings (1600, dash-dotted line) and the method of the present invention (1700). In all methods, there is a dry-off date (1830), the date of a final milking, which is typically about 180 days after insemination or about 60 days before the expected date of calving for a cow.

Ranges of dry-off dates are typically in a range of 55-65 days before calving for a cow, 30-90 days before lambing for a sheep, 40-60 days before kidding for a goat, and 60-90 days before calving for a buffalo. They can be in a range of 30-90 days before calving for a cow, 20-100 days before lambing for a sheep, 25-70 days before kidding for a goat, and 45-100 days before calving for a buffalo. No milking is done after the dry-off date.

In abrupt dry-off (1500), the dairy animal is milked normally until the dry-off date (1830) and may be producing a considerable quantity of milk at the time of start of dry-off (1510). In this illustrative example, the exemplary cow is producing more than 25 liters per day on the dry-off date (1830). After the start of dry-off (1840), although milking has been stopped, milk production by the dairy animal has not; the dairy animal can continue to produce milk for many days thereafter.

In a typical increasing-interval method (1600, dot-dashed line) in the prior art, there is a time interval, the drying-off period (1800), typically about 10 days to 2 weeks before the dry-off date (1830), with a minimum of about 5 days and a maximum of about 3 weeks. During the drying-off period (1800), the time interval between milkings is increased, although the dairy animal is milked-out normally at each milking. During this period, milk production will decrease more than for abrupt dry-off (1500), but there can still be significant milk production on (1610) and after (1840) the dry-off date (1830).

In the gradual drying-off method (1700, dashed line) of the present invention, the start (1820) of the drying-off period (1800) can be determined, as disclosed herein, from a combination of factors measured during at least one milking (1810). When the criteria for gradual drying-off have been satisfied, the drying-off period (1800) starts (1820) with a predetermined subsequent milking, such as the next milking or the next day's first milking. During the drying-off period (1800), the interval between milking is not changed, but the dairy animal is not milked out; only a predetermined fraction of the quantity of milk calculated to be in the udder (or quarter, for quarter milking) is removed. The intra-quarter pressure from the milk remaining in the udder results in a relatively rapid decrease in milk production by the dairy animal, so that, when the dry-off date (1830) is reached, actual milk production by the dairy animal (1710) is significantly smaller than that expected with the abrupt dry-off method (1500) or the increasing-interval method (1600).

It should be noted that the dairy animal typically will not be dry at dry-off, on the dry-off date (1830). However, using the method of the present invention, her total milk production will be low enough at dry-off (typically less than 5 kg/day) that discomfort, and therefore stress, in the dairy animal will be minimized, that a natural teat plug will form and that the probability of infection in the udder will be minimized.

A dairy animal can be identified manually, automatically, and any combination thereof.

Manual identification can be, for non-limiting example, by an operative identifying an animal by her markings, by her movement patterns, by her interaction with other dairy animals, by a manually-readable identifier in communication with the animal, or by manually determining biometric identification, as disclosed hereinbelow.

Automatic identification can be by means of an automatically-readable identifier or by means of biometric identification.

A dairy animal can be in communication with an automatically-readable identifier. The automatically-readable identifier is typically in communication with, either attached to or comprising part of, an animal attachment mechanism selected from a group consisting of: an ear tag, a body tag, a head collar, a neck collar, a harness, a bracelet attachable to a leg, an embedment in said dairy animal and any combination thereof. In many dairy animal identification systems, an ear tag is used.

The advanced animal identification tag can further comprise a sensor or sensors configured to enable determination of the dairy animal's health and can further be enabled to determine distress in the dairy animal.

Biometric identification can be selected from a group consisting of: identifying at least one marking on said animal, identifying a muzzle print image of said animal, identifying an iris pattern of said animal, identifying a retinal vascular pattern of said animal, facial recognition of said animal, recognition of an external physical feature of said animal, identifying an ear vascular pattern of said animal, and any combination thereof.

Non-limiting examples of an external physical feature include: shape of a portion of the dairy animal, size of a portion of the dairy animal, color of a portion of the dairy animal, relationship between shape of a portion of the dairy animal, size of a portion of the dairy animal, color of a portion of the dairy animal, and any combination thereof.

Non-limiting examples of means by which at least one external physical feature can be recognized include: an image of at least a portion of the dairy animal taken from the rear, an image of at least a portion of the dairy animal taken from a side, an image of at least a portion of the dairy animal taken from the front, an image of at least a portion of the dairy animal taken from above, and an image of at least a portion of the dairy animal taken from below.

In some embodiments, a dairy animal enters a milking stall, where a milking stall is any milking-enabled area. The milking stall can be a tie stall, a milking parlor, a milking robot, or any other conventional means of providing access to a device for machine milking a dairy animal. A device used for machine milking can include, but is not limited to, a bucket milker, a pipeline milker, a tie stall, a milking parlor station, a voluntary milking system station, a rotary milking system station, a herringbone milking system station, a milking robot and any combination thereof.

The dairy animal is automatically identified and a milking history, comprising an amount of milk produced during at least the previous milking, preferably an amount produced for each milking for a plurality of consecutive previous milkings and still more preferably, an amount produced for each milking for a week's previous milkings. The amount produced can be stored as the per-quarter amount for each quarter or the total amount produced by all milked quarters.

Figure 3:
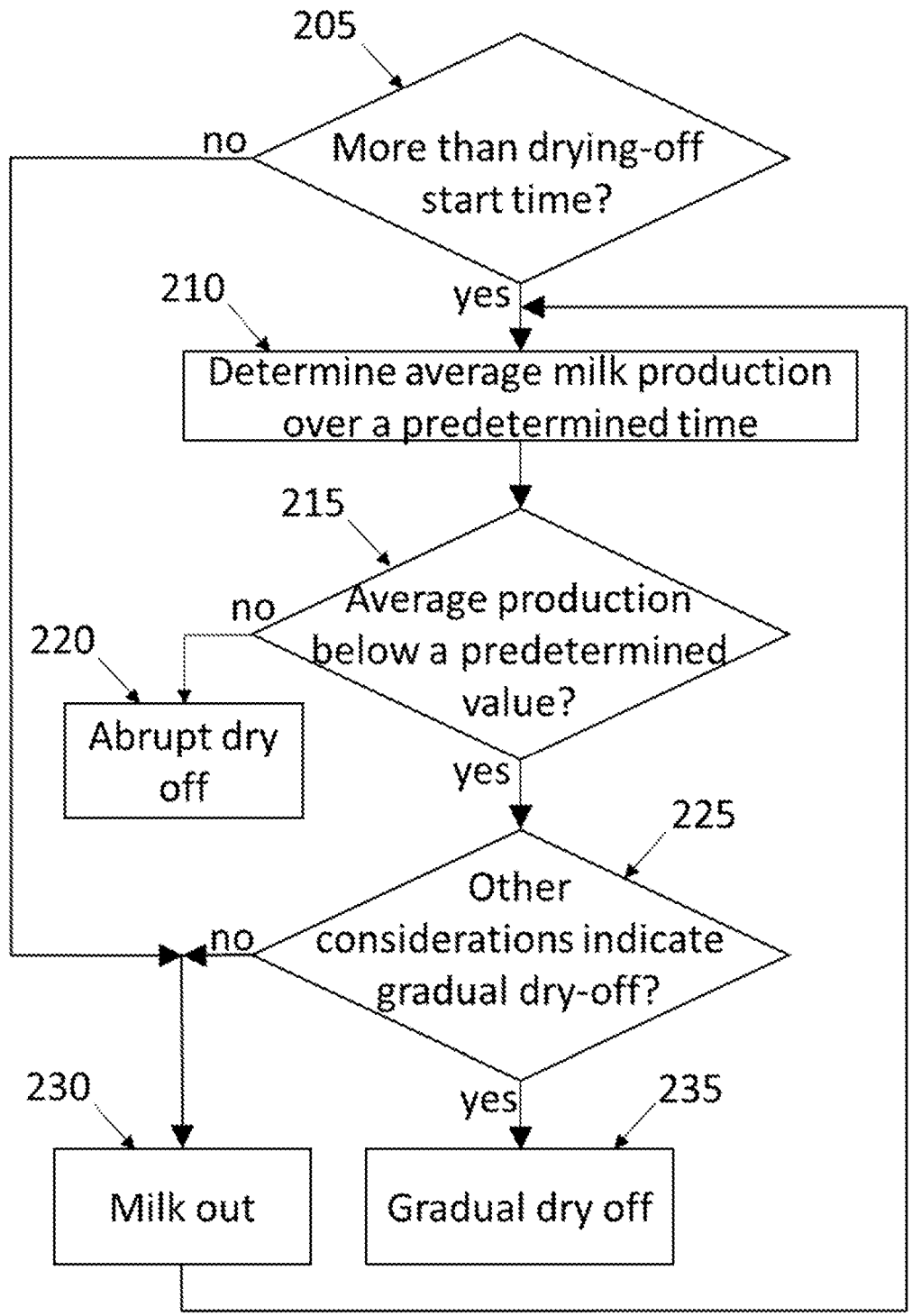
FIG. 3 illustrates an embodiment of a determination of a dry-off method.

FIG. 3 shows an embodiment of a method for determining whether gradual drying-off or abrupt dry-off will be used, for milking systems where total milk production is measured. Using the dairy animal's identity, the duration of gestation for the dairy animal is determined. If the duration of gestation (205) is less than a predetermined time, the drying-off start time, the dairy animal is milked out (230).

The drying-off start time is determined by subtracting, from a predetermined date before parturition, a predetermined drying-off period, the drying-off start time being previous to the predetermined date before parturition. The date before parturition is typically in a range of 30-90 days before calving for a cow, 20-100 days before lambing for a sheep, 40-60 days before kidding for a goat, and 60-90 days before calving for a buffalo, but can be in a range of 30-90 days before calving for a cow, 20-100 days before lambing for a sheep, 25-70 days before kidding for a goat, and 45-100 days before calving for a buffalo. The predetermined drying-off period is typically between 7 days and 3 weeks, preferably between 10 days and 2 weeks.

If the date provided by the duration of gestation (205) is after than the drying-off start time, the average milk production (210) per milking is determined over a predetermined period, the production measurement period, with the production measurement period being in a range of one day to 2 weeks, with a preferred production measurement period being 7 days.

If the average milk production (215) is less than a predetermined amount of milk (e.g., 10 kg/day for a dairy cow) the abrupt dry-off method (220) is used and milking is discontinued immediately—the just-completed current milking is the last milking of this lactation. However, the dairy animal can remain with her social group and can continue to follow her normal routine, including entering the milking stall as normal, although she will not be milked.

If the average milk production (215) is greater than the predetermined amount of milk and either no other considerations (225) are taken into account or the at least one other consideration (225) indicates gradual drying-off, an embodiment of the gradual drying-off method (235) of the present invention is instituted.

If the average milk production (215) is greater than the predetermined amount and the at least one other consideration (225) does not indicate gradual drying-off, the dairy animal is milked out (230).

The other considerations can include, but are not limited to, the dairy animal's health, the feed the dairy animal is being given, a desired transition to another feed, the pasture the dairy animal is on, a desire to change the pasture, a need for milk (either a commercial need or a community health-related need), the dairy animal's lactation number and any combination thereof.

Typically, for a dairy cow, loss of milk production is about 30% per week, in a range from about 20% to about 40%.

The desired rate of reduction in milk production (or the desired rate of reduction of the amount of milk to be removed from a quarter) can be the same for all dairy animals in a herd, or it can be individually tailored for each dairy animal.

Figure 4:
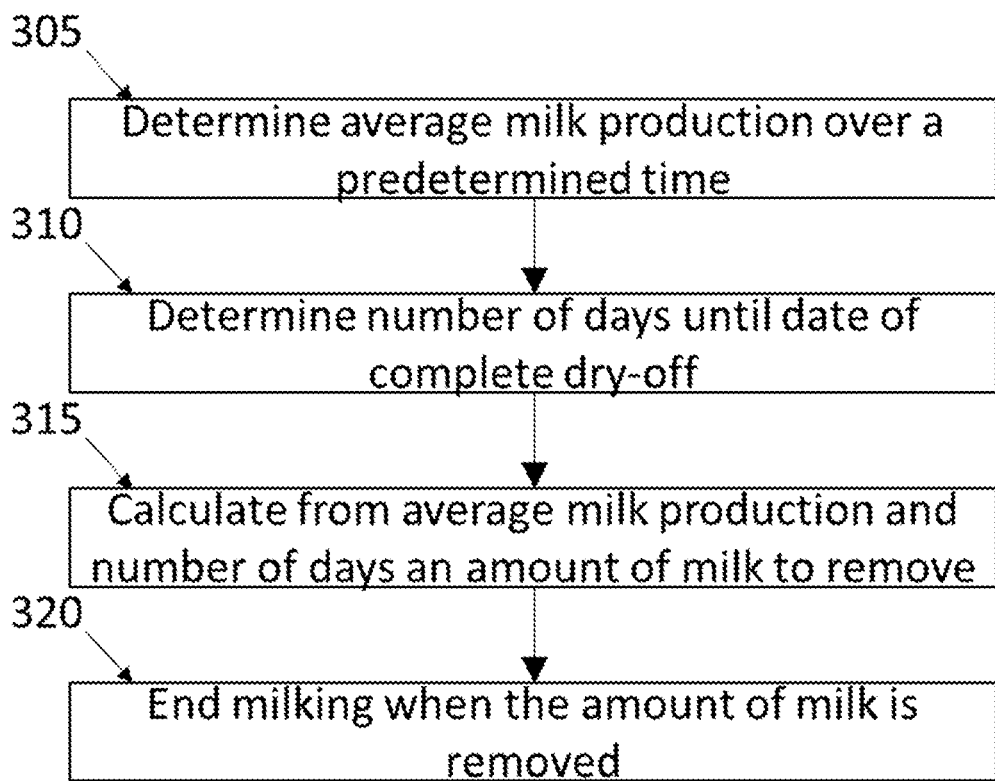
FIG. 4 illustrates an embodiment of a determination of a milking amount during a gradual drying-off.

FIG. 4 shows an embodiment of a method for determining the amount of milk to be removed from a dairy animal during a single milking session in a system where total milk production is measured. It should be noted that the amount can be calculated per dairy animal or it can be calculated separately for each milked quarter of the dairy animal. The procedure is the same in either case, although a separate sensor would be needed for each quarter to measure per-quarter production and only a single sensor would be needed if the amount is per udder. For simplicity, the amounts of milk described below will be referred to as being per udder; it is to be understood that an embodiment of the method applied per quarter is implicitly included, as the method works in the same way for both udder milking (measurement for the whole udder and cessation of milking at the same time for all teats) and quarter milking (measurement for each quarter and cessation of milking individually for each teat).

It should be noted that, in use, it is possible to apply the method with a dairy animal where not all quarters are milked. For non-limiting example, if it is known that a dairy animal has one or more non-functional quarters, the teat cup(s) need not be applied to the teat(s) for the non-functional quarter(s). In another non-limiting example, not milking a quarter can be advisable if there is injury to the teat or the quarter. Typically, the quarter(s) are known to be non-functional before the start of gradual drying-off so that the method can be applied normally with the functional quarters.

In the embodiment of FIG. 4, the average milk production (305) per milking is determined over a predetermined period, the production measurement period, with the production measurement period being in a range of one day to 2 weeks, with a preferred production measurement period being 7 days.

The number of days left (310) until the dry-off date is determined. From the average milk production and the number of days left until the dry-off date, a desired reduction in milk production over the next time period (e.g., until a next milking, a day, a week) can be calculated. From the desired reduction in milk production (315), a desired amount of milk to be left in the udder (resulting in increased intermammary udder pressure and natural reduction in milk production) can be calculated and the desired amount to be removed determined, a desired amount to be removed being the difference between the total amount expected to be in the udder and the amount to be left therein. Typically, the amount removed will be expressed as a fraction or a percentage of her average milk production, as determined above.

The desired amount to be removed is between 50% and 80% of the average milk production.

The dairy animal can then be machine milked Preferably, preparations for milking (such as, but not limited to, cleaning the teats) are carried out automatically by methods known in the art.

Preferably, attaching the teat cups to the teats is carried out automatically by a method known in the art. Machine milking is carried out automatically by a method known in the art. A milking controller, the device used for machine milking, can include, but is not limited to, a bucket milker, a pipeline milker, a tie stall, a milking parlor station, a voluntary milking system station, a rotary milking system station, a herringbone milking system station, a milking robot and any combination thereof.

Milk production, the amount of milk removed, can be measured as weight of milk removed, as volume of milk removed and any combination thereof. Volume can be converted to weight, or vice versa, using the known density of the milk.

Measuring milk production is carried out automatically by a method known in the art, typically in real time by means of a milk meter. The milk meter can be any conventional milk meter such as, but not limited to, an inline milk meter, a scale in communication with a milking processor, a container configured to measure volume in communication with a milking processor, and any combination thereof. Cessation of milking (320) occurs when the desired amount has been removed from the udder. Unlike in the prior art, takeoff flow is irrelevant; milk flow rate is not used to determine cessation of milking. The teat cups can then be removed from the teats; in some embodiments, post-milking udder treatments are applied. After teat cup removal and any post-milking treatment, the dairy animal can be removed from the milking stall, can be allowed to remove herself from a milking stall, can have a milking machine moved away from her, or she can be moved away from a milking machine.

Any of the steps in the milking process, except for milking itself, can be carried out manually and any of the steps in the milking process can be carried out automatically. The milking process, from moving the dairy animal into the milking stall (or moving a milking machine to the dairy animal) to moving the dairy animal to a resting, feeding or treatment area after milking, can comprise any combination of manual and automatic steps, except, as hereinbefore stated, the step of machine milking, a step that includes cessation of milking.

In some embodiments, before the start of dry-off, the milk flow rate is measured for the dairy animal, with, before the start of dry-off, cessation of milking occurring when the milk flow rate is below a predetermined amount. In these embodiments, the milking duration, the time between the initiation of milking and the cessation of milking, is measured and recorded. In such embodiments, total milk production may or may not be measured.

Figure 5:
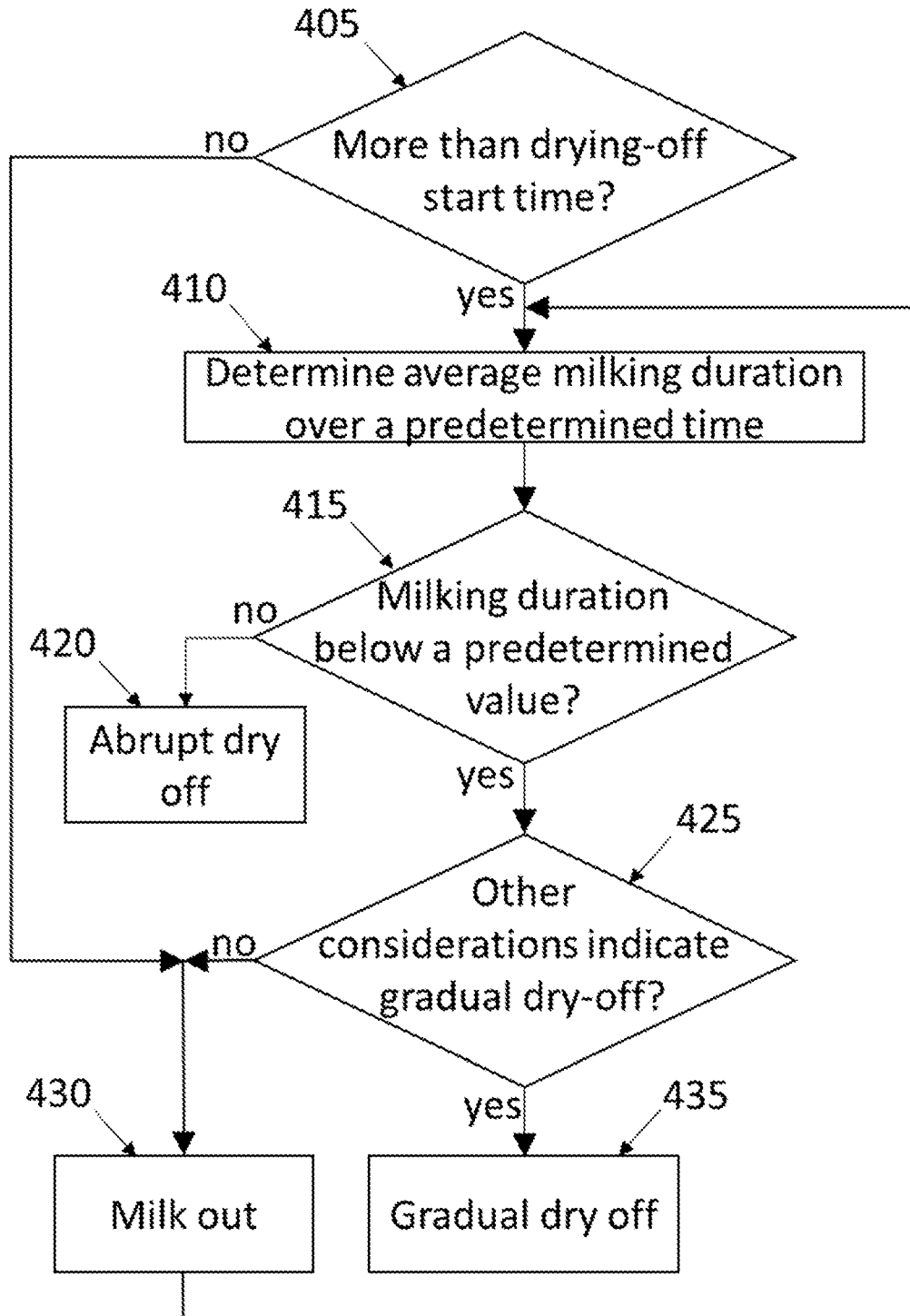
FIG. 5 illustrates an embodiment of a determination of a dry-off method.

FIG. 5 shows an embodiment of a method for determining whether gradual drying-off or abrupt dry-off will be used in a system where each milking is delimited by a total milking duration. Using the dairy animal's identity, the duration of gestation for the dairy animal is determined.

If the duration of gestation (405) is less than a predetermined time, the drying-off start time, the dairy animal is milked out (230).

The drying-off start time is determined by subtracting, from a predetermined date before parturition, a predetermined drying-off period, the drying-off start time being previous to the predetermined date before parturition. The date before parturition is typically in a range of 55-65 days before calving for a cow, 30-90 days before lambing for a sheep, 40-60 days before kidding for a goat, and 60-90 days before calving for a buffalo, but can be in a range of 30-90 days before calving for a cow, 20-100 days before lambing for a sheep, 25-70 days before kidding for a goat, and 45-100 days before calving for a buffalo. The predetermined drying-off period is typically between 7 days and 3 weeks, preferably between 10 days and 2 weeks.

If the date provided by the duration of gestation (405) is after than the drying-off start time, the milking duration (410) per milking is determined over a predetermined period, the production measurement period, with the production measurement period being in a range of one day to 2 weeks, with a preferred production measurement period being 7 days.

If the milking duration (415) is less than a predetermined amount (typically 5-6 minutes), the abrupt dry-off method (420) is used and milking is discontinued immediately—the just-completed current milking is the last milking of this lactation. However, the dairy animal can remain with her social group and can continue to follow her normal routine, including entering a milking stall as normal, although she will not be milked.

If the milking duration (415) is greater than the predetermined amount and either no other considerations (425) are taken into account or the at least one other consideration (425) indicates gradual drying-off, an embodiment of the gradual drying-off method (435) of the present invention is instituted.

If the milking duration (415) is greater than the predetermined amount and the at least one other consideration (425) does not indicate gradual drying-off, the dairy animal is milked out (430).

The other considerations can include, but are not limited to, the dairy animal's health, the feed the dairy animal is being given, a desired transition to another feed, the pasture the dairy animal is on, a desire to change the pasture, a need for milk (either a commercial need or a community health-related need), the dairy animal's lactation number and any combination thereof.

The desired rate of reduction in milk production (or the desired rate of reduction in milking duration) can be the same for all dairy animals in a herd, or it can be individually tailored for each dairy animal.

Figure 6:
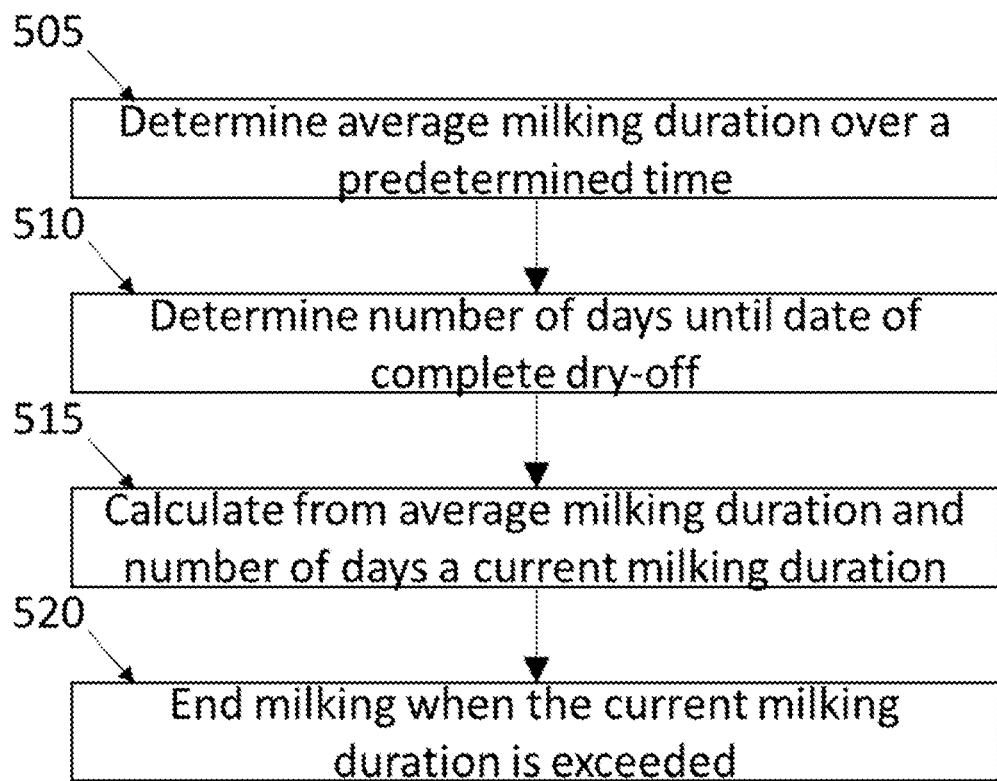
FIG. 6 illustrates an embodiment of a determination of a milking duration during a gradual drying-off.

FIG. 6 shows an embodiment of the method wherein the milking duration is determined for a single milking session. It should be noted that the duration can be calculated per dairy animal or it can be calculated separately for each milked quarter of the dairy animal. The procedure is the same in either case, although a separate timer would be needed for each quarter to measure per-quarter duration and only a single timer would be needed if the duration is per udder. For simplicity, the durations described below will be referred to as being per udder; it is to be understood that an embodiment of the method applied per quarter is implicitly included, as the method works in the same way for both udder milking (duration for the whole udder and cessation of milking at the same time for all teats) and quarter milking (duration for each quarter and cessation of milking individually for each teat).

It should be noted that, in use, it is possible to apply the method with a dairy animal where not all quarters are milked. For non-limiting example, if it is known that a dairy animal has one or more non-functional quarters, the teat cup(s) need not be applied to the teat(s) for the non-functional quarter(s). In another non-limiting example, not milking a quarter can be advisable if there is injury to the teat or the quarter. Typically, the quarter(s) are known to be non-functional before the start of gradual drying-off so that the method can be applied normally with the functional quarters.

In the embodiment of FIG. 6, average milking duration (505) per milking is determined over a predetermined period, with the minimum predetermined period being one day, the maximum predetermined period being 2 weeks and a preferred predetermined period being 7 days.

The number of days left (510) until the dry-off date is determined. From the average milking duration and the number of days left until the dry-off date, a desired reduction in milking duration over the next time period (e.g., until a next milking, a day, a week) can be calculated. From the desired reduction in milking duration (515), which will result in milk left in the udder (resulting in increased intermammary udder pressure and natural reduction in milk production) a current milking duration can be calculated, which is the desired milking duration for at least the next milking.

The current milking duration will be between 50% and 80% of the average milking duration.

The dairy animal can then be machine milked Preferably, preparations for milking (such as, but not limited to, cleaning the teats) are carried out automatically by methods known in the art.

Preferably, attaching the teat cups to the teats is carried out automatically by a method known in the art. Machine milking is carried out automatically by a method known in the art. Although not required, milk production can be measured. Measuring milk production, if done, is typically is carried out automatically by a method known in the art, typically by means of a milk meter. The milk meter can be any conventional milk meter such as, but not limited to, an inline milk meter, a scale in communication with a milking processor, a container configure to measure volume in communication with a milking processor, and any combination thereof. Cessation of milking (520) occurs when the desired milking duration has been exceeded. Unlike in the prior art, once gradual drying-off has been instituted, takeoff flow is irrelevant; milk flow rate is not used to determine cessation of milking. The teat cups can then be removed from the teats; in some embodiments, post-milking udder treatments are applied. After teat cup removal and any post-milking treatment, the dairy animal can be removed from the milking stall, can be allowed to remove herself from a milking stall, can have a milking machine moved away from her, or she can be moved away from a milking machine.

Any of the steps in the milking process, except for milking itself, can be carried out manually, semi-automatically or automatically. The milking process, from moving the dairy animal into the milking stall to moving the dairy animal to a resting, feeding or treatment area after milking, can comprise any combination of manual and automatic steps, except, as hereinbefore stated, the step of machine milking, where the step of machine milking includes cessation of milking.

For non-limiting example, initiation of milking, the act of starting removal of milk from the teats, can be manual where, for non-limiting example, after the teat cups are emplaced on the teats, a button is pressed or a switch is flipped to start a milking machine. Initiation of milking can be semi-automatic where, for non-limiting example, after the teat cups are emplaced on the teats, after receiving a signal that an automatic check has verified that the milking device is in proper condition for milking, a button can be pressed or a switch flipped to start a milking machine. In automatic initiation of milking, after the teat cups are emplaced on the teats, milking is initiated automatically.

In embodiments where other considerations can be monitored, either manually or via an advanced identification tag, adjustments can be made to the gradual drying-off rate so as to minimize stress in the dairy animal during the gradual drying-off period, to respond to changes in considerations, and any combination thereof.

It should be noted that, although recommended values can be given and recommended ranges are provided, a user of the system can alter, via the system, at least one of the dry-off date (e.g., as a number of days before expected parturition, as a number of days after insemination, as a number of days after start of gestation), the dry-off period (the time period between start of gradual dry-off and the dry-off date), the predetermined amount of milk that determines whether abrupt dry-off or gradual drying off will be used, the predetermined drying-off start time, and the amount of milk to be removed per milking as a fraction of average milk production, the milking duration as a fraction of average milking duration, and the production measurement period (the time over which milk production is measured).

The invention claimed is:

1. A method for automatically drying-off a dairy animal, comprising steps of:
   determining, by a processor, an average milk production for said dairy animal by averaging of milk production per milking over a production measurement period;
   upon said average milk production being greater than a predetermined amount of milk
   and at least one other consideration being met, start a drying off process, including,
   for each current milking of said dairy animal until a dry-off date at which a predetermined drying-off period end:
      determining, by the processor, utilizing a current date and said dry-off date, a number of days until said dry-off date;
      determining, by the processor, an amount of milk to be removed utilizing (a) said number of days until said dry-off date, and (b) the average milk production;
      machine milking said dairy animal;
      measuring, by the processor, removal of milk in real time during milking; and,
      at such time as said milk production is greater than said amount of milk to be removed, stopping said current milking.

2. The method of claim 1, wherein the criteria includes that the duration of gestation is after a predetermined drying-off start time.

3. The method of claim 1, wherein the dry-off date is determined using a start date and a predetermined dry-off period, the start date being a date at which the average milk production is greater than a predetermined amount of milk.

4. The method of claim 1, wherein said amount of milk to be removed is independent of flow rate of milk from said dairy animal.

5. The method of claim 1, wherein said average milk production is average daily milk production.

6. The method of claim 1, additionally comprising a step of providing a system for milking said dairy animal, said dairy animal uniquely identifiable; said system comprising:
   a milking controller configured to control said removal of milk from said dairy animal's udder;
   at least one milk meter in communication with said milking controller, said at least one milk meter configured to measure an amount of said removal of milk; and
   at least one milking processor, said milking processor configured to determine said amount of milk to be removed by said milking controller; said milking processor further configured to store, for said dairy animal, at least one previous amount of milk removed and to generate, for said dairy animal, said average milk production from said at least one previous amount of milk removed.

7. The method of claim 1, additionally comprising a step of selecting said at least one other consideration from a group consisting of: a dairy animal's health, feed a dairy animal is being given, a need to transition to another feed, pasture a dairy animal is on, a desire to change pasture, a need for milk, a dairy animal's lactation number and any combination thereof.

8. The method of claim 1, additionally comprising steps of, for said at least one other consideration not indicating gradual drying-off, milking-out at each milking until either said average milk production is less than or equal to said predetermined amount of milk; and for said at least one other consideration indicating gradual drying-off, selecting abrupt dry-off for average milk production being less than or equal to said predetermined amount of milk and selecting gradual drying-off for average milk production being greater than said predetermined amount of milk.

9. The method of claim 1, additionally comprising a step of identifying said dairy animal using biometric identification selected from a group consisting of:
   identifying at least one marking on said animal, identifying a muzzle print image of said animal, identifying an iris pattern of said animal, identifying a retinal vascular pattern of said animal, facial recognition of said animal, recognition of an external physical feature of said animal, identifying an ear vascular pattern of said animal, and any combination thereof.

10. The method of claim 1, additionally comprising a step of selecting said production measurement period to be in a range of one day to 2 weeks.

11. The method of claim 1, additionally comprising a step of selecting said predetermined drying-off start time to be an expected parturition date minus the sum of a predetermined amount of time before expected parturition and said predetermined drying-off period.

12. The method of claim 11, additionally comprising a step of selecting said predetermined amount of time before expected parturition to be in a range of 30-90 days before calving for a cow, 20-100 days before lambing for a sheep, 25-70 days before kidding for a goat, and 45-100 days before calving for a buffalo.

13. The method of claim 11, additionally comprising a step of selecting said predetermined drying-off period to be in a range of 7 days to 3 weeks.

14. A drying-off system for automatically drying-off a dairy animal, said drying-off system comprising a processor comprising instructions configured to:
   determine an average milk production for said dairy animal by averaging of milk production per milking over a production measurement period;
   upon said average milk production being greater than a predetermined amount of milk
   and at least one other consideration being met, start a drying off process, including, for each current milking of said dairy animal until a dry-off date at which a predetermined drying-off period end:
determine, utilizing a current date and said dry-off date, a number of days until said dry-off date;
determine an amount of milk to be removed utilizing (a) said number of days until said dry-off date, and (b) the average milk production;
machine milk said dairy animal;
measure removal of milk in real time during milking; and
at such time as said milk production is greater than said amount of milk to be removed, stop said current milking.

* * * * *